US011501516B2

(12) United States Patent
Nelson et al.

(10) Patent No.: US 11,501,516 B2
(45) Date of Patent: Nov. 15, 2022

(54) SYSTEMS AND METHODS FOR PERFORMING IMAGE ANALYSIS AND IDENTIFYING AND ASSIGNING DAMAGE TO MATERIAL OBJECTS

(71) Applicant: RENTCHECK HOLDINGS, INC., New Orleans, LA (US)

(72) Inventors: Marco Nelson, New Orleans, LA (US); William P. Evers, Paoli, PA (US)

(73) Assignee: RENTCHECK HOLDINGS, INC., New Orleans, LA (US)

( * ) Notice: Subject to any disclaimer, the term of this patent is extended or adjusted under 35 U.S.C. 154(b) by 214 days.

(21) Appl. No.: 16/916,045

(22) Filed: Jun. 29, 2020

(65) Prior Publication Data
US 2020/0410278 A1 Dec. 31, 2020

Related U.S. Application Data

(60) Provisional application No. 62/868,477, filed on Jun. 28, 2019.

(51) Int. Cl.
*G06Q 40/00* (2012.01)
*G06V 10/44* (2022.01)
(Continued)

(52) U.S. Cl.
CPC ............ *G06V 10/44* (2022.01); *G06Q 40/08* (2013.01); *G06T 7/0002* (2013.01); *G06V 20/00* (2022.01); *G06T 2207/20081* (2013.01)

(58) Field of Classification Search
USPC ............ 705/4, 5, 2, 39, 38, 37, 40; 235/380, 235/375; 700/245; 715/708; 709/227,
(Continued)

(56) References Cited

U.S. PATENT DOCUMENTS 8,756,085 B1 6/2014 Plummer et al.
9,709,922 B2 * 7/2017 Narita ................ G03G 15/0856
(Continued)

OTHER PUBLICATIONS

Extracting information from remote sensing data for applications to flood monitoring and damage evaluation; 2012 Tyrrhenian Workshop on Advances in Radar and Remote Sensing (TyWRRS) (pp. 275-282); S. B. Serpico, S. Dellepiane, G. Moser, G. Boni, R. Rudari, Sep. 12, 2012. (Year: 2012).*
(Continued)

*Primary Examiner* — Tien C Nguyen
(74) *Attorney, Agent, or Firm* — Greenberg Traurig, LLP

(57) ABSTRACT

A method for determining damage caused to a property includes receiving a first image of an object, the first image being captured at a first time. The method further includes receiving a second image of the object, the second image being captured at a second time different from the first time. The method further includes determining that the object in the first image is a same object in the second image and aligning features of the object in the first image to the features of the object in second image. The method further includes determining at least one difference based on a comparison between the first image and the second image. The method further includes determining that the at least one difference indicates damage to the object that exceeds wear and tear depreciation damage based on an amount of elapsed time between the first time and the second time.

17 Claims, 25 Drawing Sheets

(51) Int. Cl.
*G06Q 40/08* (2012.01)
*G06T 7/00* (2017.01)
*G06V 20/00* (2022.01)

(58) Field of Classification Search
USPC .................................................. 709/226
See application file for complete search history.

(56) References Cited

U.S. PATENT DOCUMENTS

| | | | |
|---|---|---|---|
| 10,134,092 B1* | 11/2018 | Harvey | G06Q 40/08 |
| 10,445,796 B2 | 10/2019 | Ahroon | |
| 2014/0316825 A1 | 10/2014 | van Dijk et al. | |
| 2015/0067458 A1* | 3/2015 | Skinner | G06F 16/51 |
| | | | 715/201 |
| 2015/0186953 A1* | 7/2015 | Gross | G06Q 50/16 |
| | | | 705/14.58 |
| 2015/0363874 A1* | 12/2015 | Wallander | G06Q 40/025 |
| | | | 705/38 |
| 2018/0012350 A1* | 1/2018 | Gangitano | H04N 5/247 |
| 2018/0152641 A1* | 5/2018 | Loosli | G06Q 40/025 |

OTHER PUBLICATIONS

An AR Inspection Framework: Feasibility Study with Multiple AR Devices; 2016 IEEE International Symposium on Mixed and Augmented Reality (ISMAR-Adjunct) (pp. 221-226); Perla Ramakrishna, Ehtesham Hassan, Ramya Hebbaluguppe, Monika Sharma, Gaurav Gupta, Lovekesh Vig, Geetika Sharma. Sep. 19, 2016. (Year: 2016).*

Mobile Augmented Reality Survey: From Where We Are to Where We Go; IEEE Access (vol. 5, pp. 6917-6950); Dimitris Chatzopoulos; Carlos Bermejo; Zhanpeng Huang; Pan Hui; Jan. 1, 2017. (Year: 2017).*

Mobile Inspection App—SnapInspect, SnapInspect (Jun. 27, 2019), https://web.archive.org/web/20190627145545/tittps://www.snapinspect.com/property-inspection-app.

Compare pictures, music and video metadata, Compare Suite (Jul. 29, 2018), https://web.archive.org/web/20180729194440/https://comparesuite.com/compare-multimedia.htm.

* cited by examiner

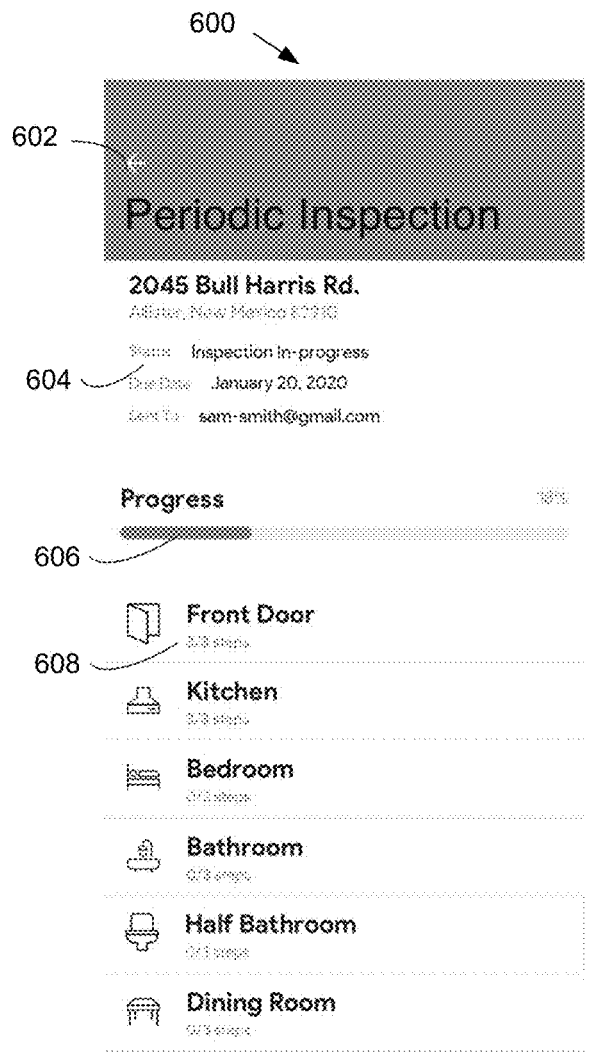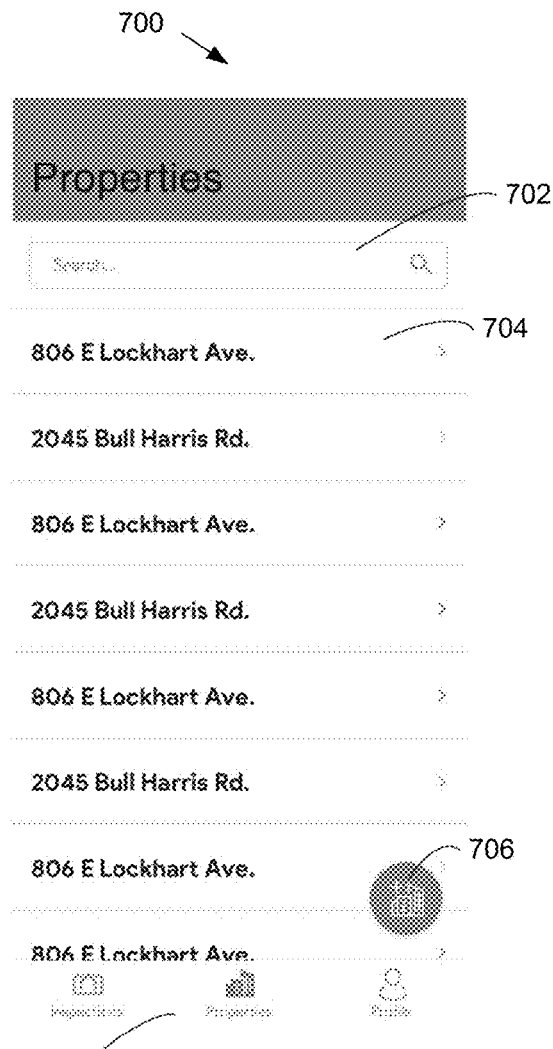
FIG. 6
FIG. 7

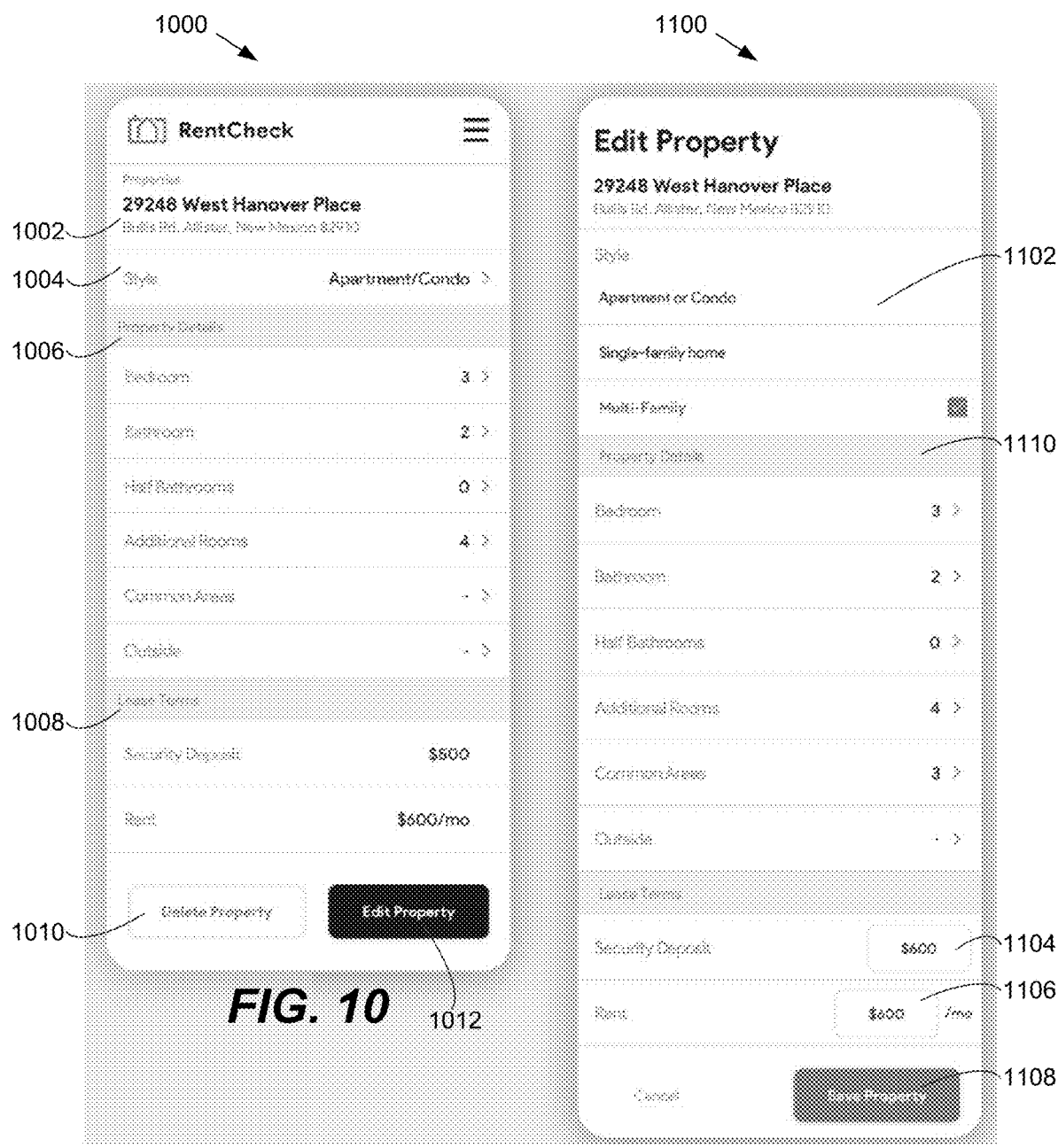

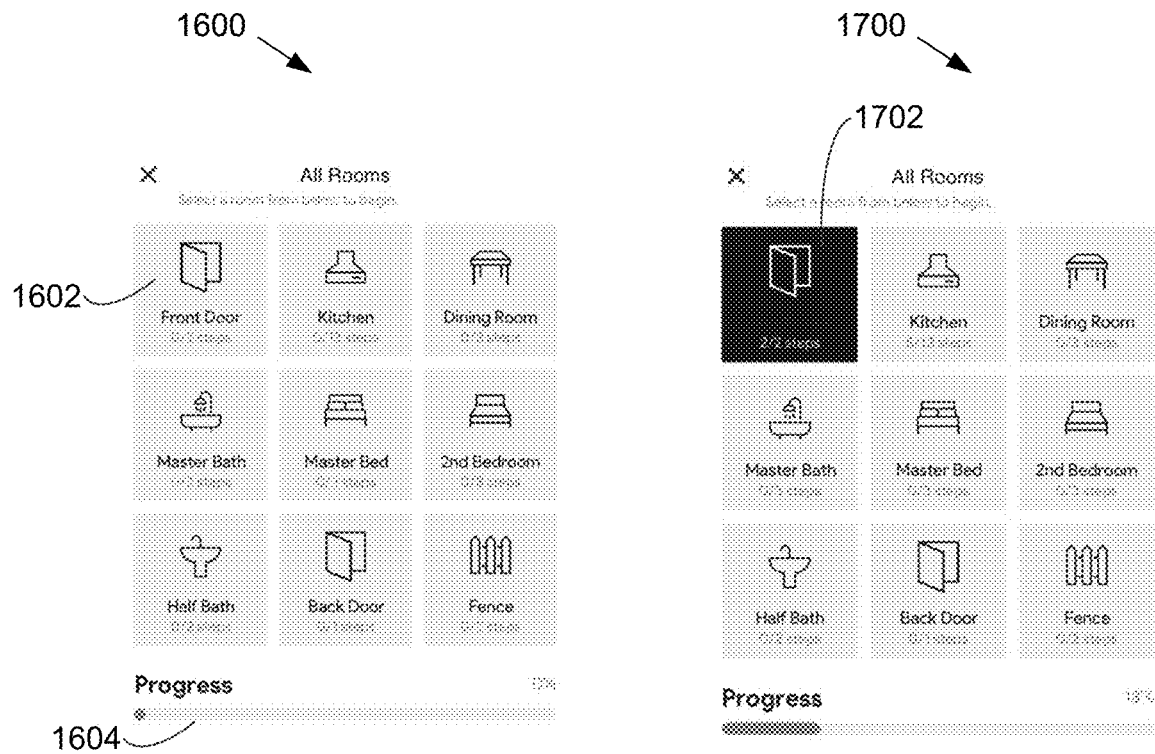
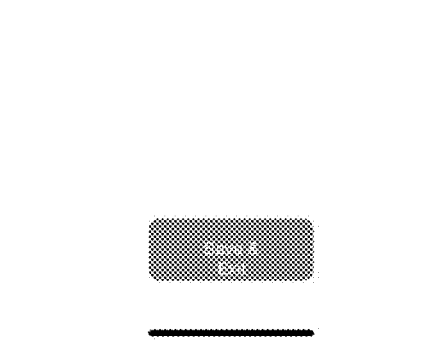
FIG. 16
FIG. 17

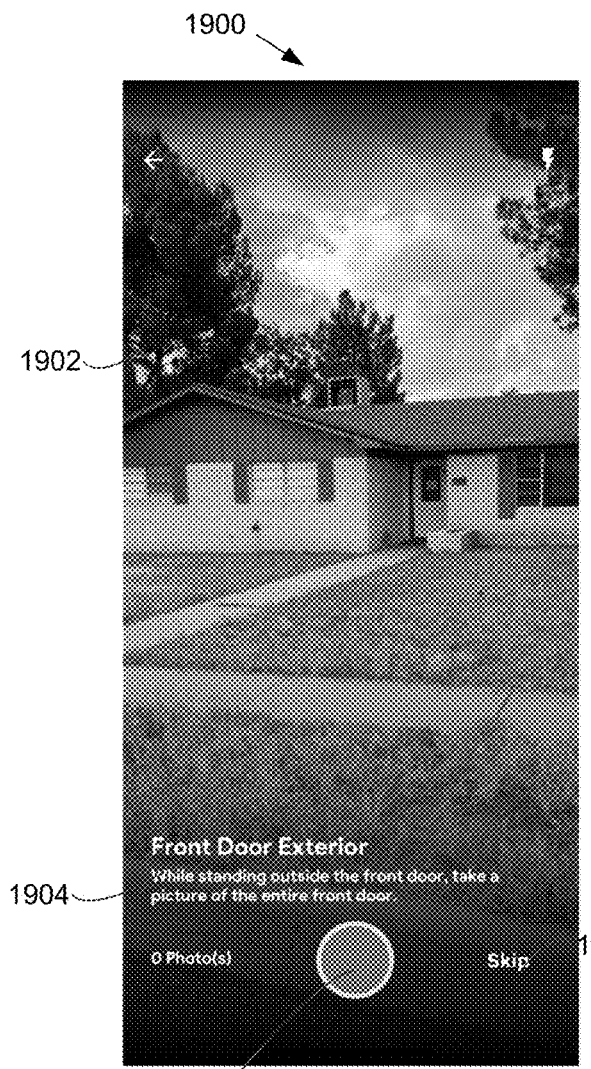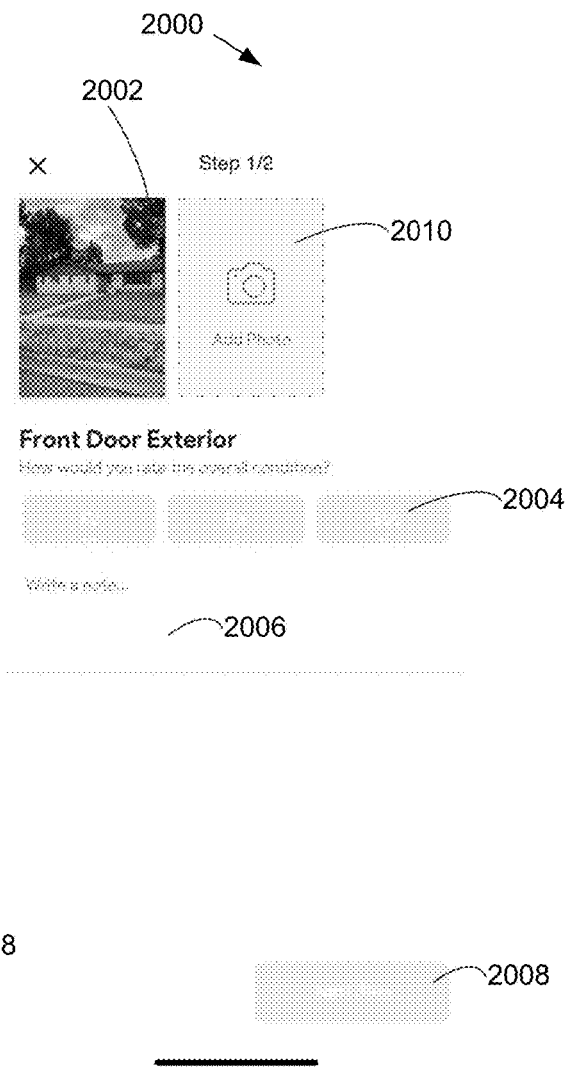
FIG. 19
FIG. 20

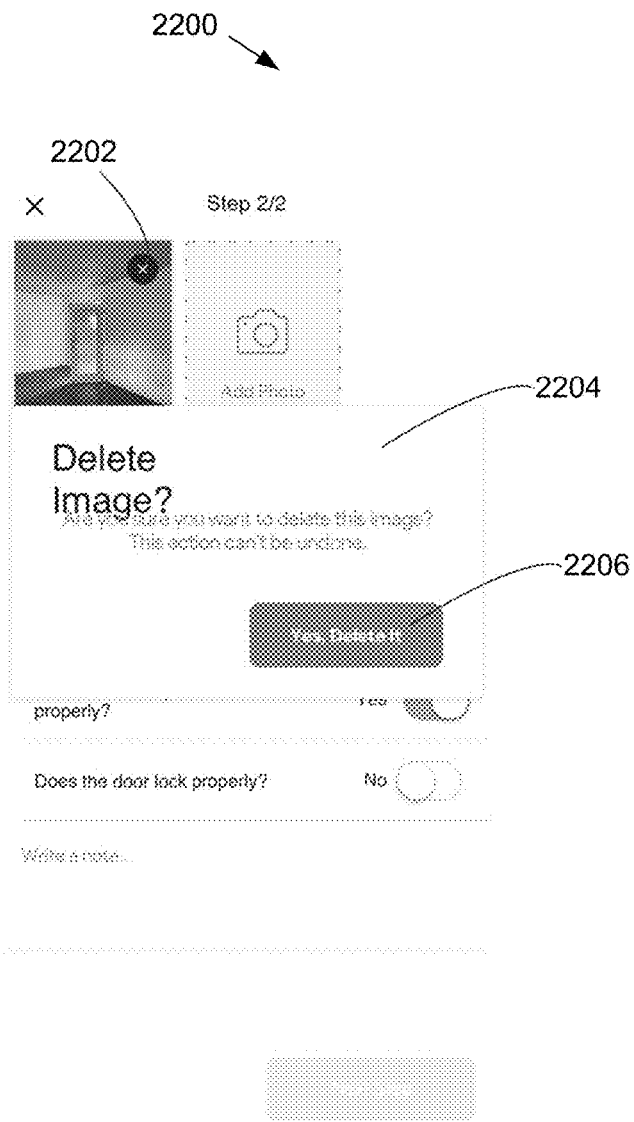
FIG. 21
FIG. 22

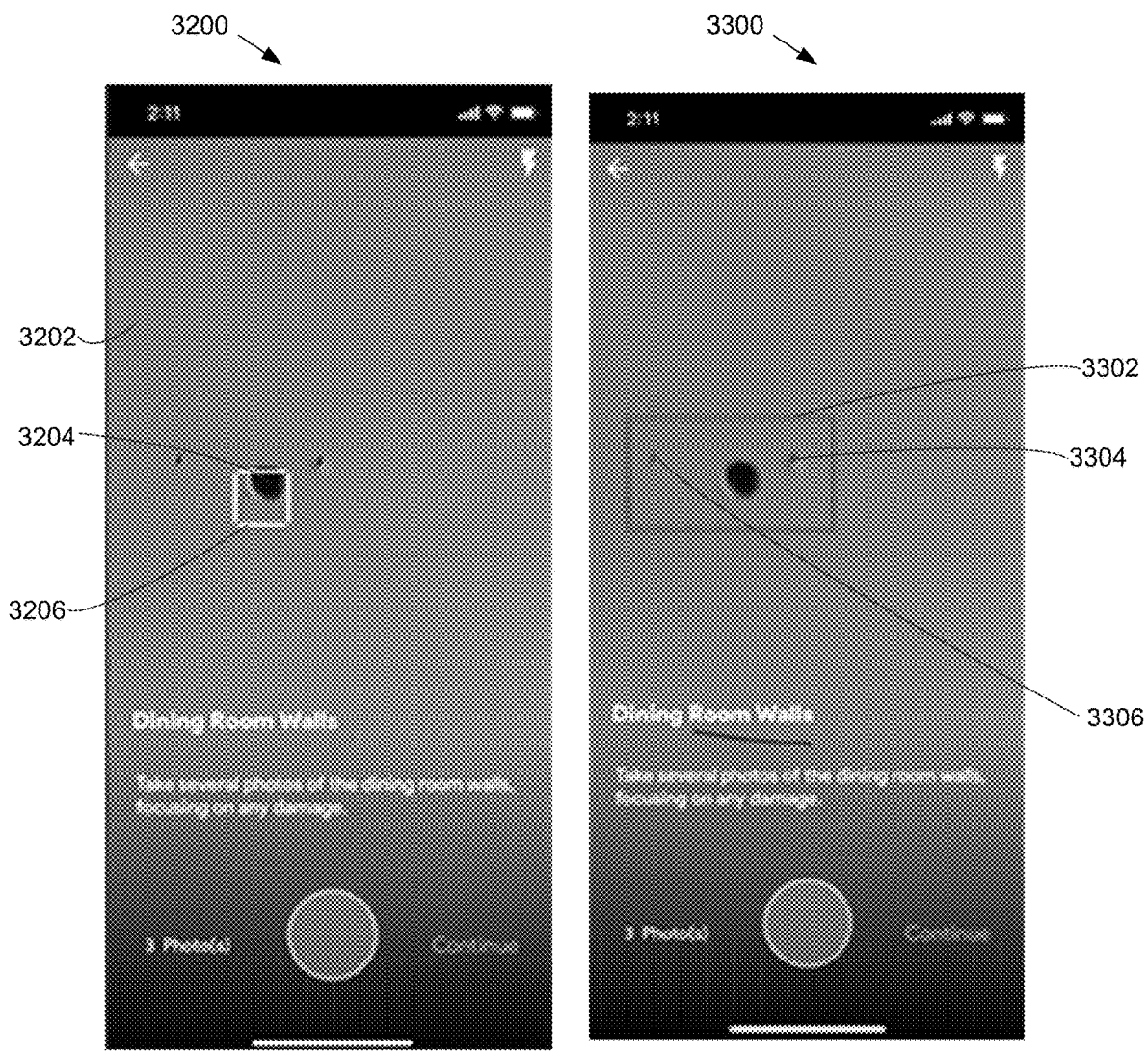

SYSTEMS AND METHODS FOR PERFORMING IMAGE ANALYSIS AND IDENTIFYING AND ASSIGNING DAMAGE TO MATERIAL OBJECTS

CROSS-REFERENCE TO RELATED PATENT APPLICATION

This application claims the benefit of U.S. Provisional Patent Application No. 62/868,477, filed Jun. 28, 2019, the entire contents of which is hereby incorporated by reference.

BACKGROUND

Many people rent property to live in, do business in, etc. from a property owner, also referred to as a landlord. The renters, also referred to as tenants, are often financially responsible for any damages that occur to a property, often including a building or any corresponding fixtures, during a lease term. In furtherance of this responsibility, landlords often require a security deposit from which funds may be deducted at the end of the lease term if there is damage to the property. Any funds left from the security deposit after any damages are accounted for are typically returned to the renter after the conclusion of the lease term.

SUMMARY

An illustrative method for determining damage caused to an object associated with a property includes receiving, by a processor of a computing device, a first image of an object, the first image being captured at a first time. The method further includes receiving, by the processor, a second image of the object, the second image being captured at a second time different from the first time. The method further includes determining, by the processor, that the object in the first image is a same object in the second image. The method further includes aligning, by the processor, features of the object in the first image to the features of the object in second image. The method further includes determining, by the processor, at least one difference associated with the object based on a comparison between the first image and the second image. The method further includes determining, by the processor, that the at least one difference indicates damage to the object that exceeds wear and tear depreciation damage based at least in part on an amount of elapsed time between the first time and the second time.

An illustrative non-transitory computer readable medium has instructions stored thereon that, upon execution by a computing device, cause the computing device to perform operations. The operations include receiving a first image of an object, the first image being captured at a first time. The operations further include receiving a second image of the object, the second image being captured at a second time different from the first time. The operations further include determining at least one difference associated with the object based on a comparison between the first image and the second image. The operations further include determining that the at least one difference indicates damage to the object that exceeds wear and tear depreciation damage.

An illustrative method for capturing an image of an object associated with a property using a mobile computing device includes displaying, by a processor of the mobile computing device, a first image representing a field of view of a camera of the mobile computing device on a display of the mobile computing device. The method further includes overlaying, by the processor, a representation of an object associated with a property on the display that is also displaying the first image. The method further includes displaying, by the processor, instructions for capturing a second image. The instructions are displayed on the display along with the representation and the first image. The method further includes receiving, by the processor, an input requesting capture of the field of view of the camera. The method further includes saving, by the processor, a second image captured by the camera in response to the input. The second image comprises an actual object associated with the property. The second image is saved in a memory of the mobile computing device without the instructions or the representation of the object overlaid on the second image. The instructions and the representation of the object are configured such that the second image capture is comparable to a third image captured of the actual object at a different time from when the second image was captured.

BRIEF DESCRIPTION OF THE DRAWINGS

FIGS. 4-27 are example user interfaces for inspecting a property and capturing images of the property, in embodiments.

FIGS. 32-37 are example user interfaces for detecting or selecting areas within an image that show damage to an object, in embodiments.

DETAILED DESCRIPTION

Figure 1:
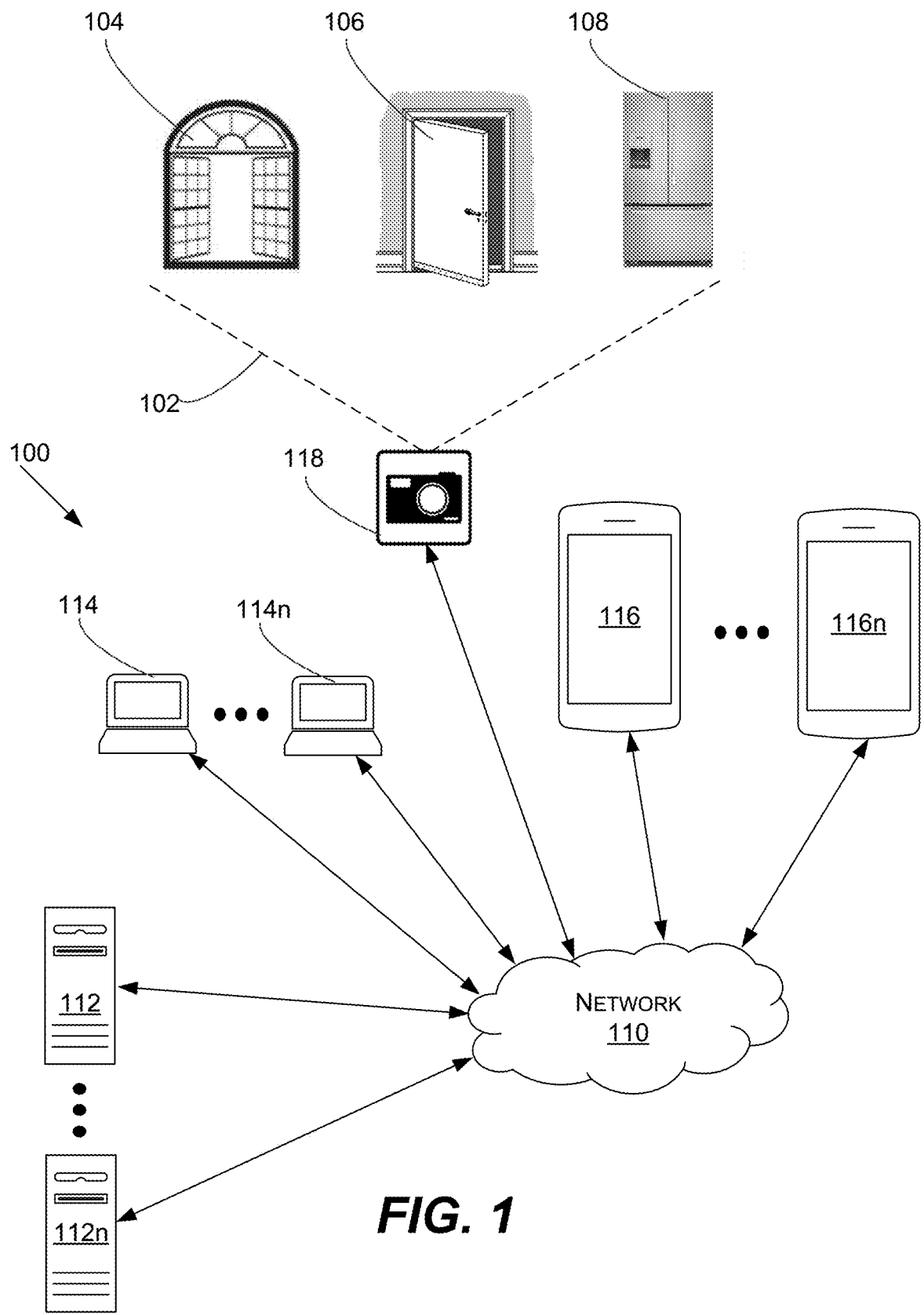
FIG. 1 is a schematic diagram of an example system for performing image analysis and identifying and assigning damage to material objects, in embodiments.

Various embodiments for and aspects of a computer implemented application for performing property inspections, capturing images associated with property inspections, and using those captured images are described herein. For example, a mobile application or web-based interface as described herein may be used by a landlord, tenant, or property manager to input information about a property, record information about the property including condition of the objects on/in the property, capture images of objects on/in the property, and save the information related to an inspection for recordkeeping and later comparison. An object as referred to herein may refer to any aspect of a property, such as natural features, buildings, portions of buildings, fixtures installed on the property, etc.

In addition to systems and methods for performing property inspections on a mobile device, another use of the disclosed systems and methods is to resolve landlord-tenant disputes about the condition of property. A user of a mobile application may be presented with a number of prompts based on the type of property being inspected. At each prompt, the user may be asked to provide a response to said prompt, which may be an answer to a question or a picture taken using the camera of the mobile device. The application running on the mobile device may communicate responses to said prompts to a server on or over the internet. The system may prepare reports, which reports may include the responses to said prompts, for the purpose of serving as an easy-to-read display of the information collected about a property by the user of the mobile application.

The systems and methods herein may further address problems inherent in current technology that is used for documenting property inspections and assessing the extent of damage that occurs on the property. For example, landlords or tenants often take pictures of damage that occurs on a rental property to document such damage, but there may not be pictures of the property or object before the damage occurred. Furthermore, landlords and tenants may disagree as to the extent of or cost to repair damage to a property or object on the property. The systems and methods described herein further include aspects for standardizing both the analysis of damaged objects and the assessment of how much damage has occurred (e.g., how much money it will cost to fix the damage or replace the object).

Furthermore, it can be difficult to tell upon inspecting an object once whether the object has typical wear and tear depreciation damage based on the amount of time the object has been in use versus material damage above and beyond wear and tear caused by a tenant. The systems and methods described herein provide for both recordkeeping of objects over time, as well as training and using machine learning models to better analyze and calculate damage to objects, including determining whether damage exceeds wear and tear damage or not. In this way, disputes between landlords and tenants may be minimized as damage calculations may be objectively calculated rather than relying on the subjective opinions of a landlord or tenant.

In this way, property inspections may be standardized using the technology described herein to document the material condition of a rental property, whether residential or commercial, including by using captured images (e.g., video, photographs) of a property in order to automate the comparison of the conditions of various aspects of a property over time.

The systems and methods described herein may also provide for guided inspections that make the inspections easier and more efficient to complete. For example, the prompts provided to a user may be presented in an order that makes the inspection more efficient based on a floor plan of the property, an amount of time it takes to perform each task, known aspects of the property based on past inspections, etc. In addition, each inspection may be customized based on the property being inspected based on the inputs from the user or other inputs (e.g., floorplans, previous inspection information, etc.).

Other aspects described herein provide improved functionality for performing inspections and/or assessing property damage. For example, when a photograph of an object on a property is being taken, an overlay of a representation of the object may be displayed on the mobile device to assist the user in aligning the image capture correctly. In addition, the mobile application may automatically identify aspects of the image such as new damage, or a user may be able to make certain inputs that indicate damage or other conditions or aspects of an object as described herein. For example, dents, marks, cracked glass, stains, holes, etc. may all be indicated as damage via user inputs or be automatically detected using image recognition as described herein. As described herein, if multiple inspections of a property are performed, the images or other documentation related to those inspections may be analyzed over time to automatically identify changes to the property or objects on the property to determine a material wear and tear depreciation or specific damage value that exceeds wear and tear associated with a property, building, or object on the property.

Systems and methods herein may also be used to aggregate inspection and damage information. As examples, wear and tear depreciation may be calculated based on how often certain types of appliances have to be replaced based on inspection information, damage information may be used to customize future inspections to focus on aspects of a property that are more likely to suffer damage, costs to repair significant damage beyond wear and tear damage may be more accurately calculated based on data input by users over time, etc.

FIG. 1 is a schematic diagram of an example system 100 for performing image analysis and identifying and assigning damage to material objects, in embodiments. The system 100 includes a camera 118 with a field of view 102. The camera 118 may be used to capture images of a property, such as a window 104, door 106, and/or refrigerator 108. Other aspects and/or objects of a property than those shown in FIG. 1 may also be captured in various embodiments. The camera 118, may also be integrated into a mobile computing device, such as mobile electronic devices 116 to 116n, electronic devices 114 to 114n, etc. In this way, any electronic device with a camera (e.g., smartphone, tablet, laptop, etc.) may be used in the various embodiments described herein to capture images.

Each of the camera 118, the mobile electronic devices 116, and the electronic devices 114 may communicate with servers 112 to 112n over a network 110. The network may be, or may include aspects of, a Wi-Fi network, the internet, a cellular data network, or any other network. The servers 112 may store information related to inspections and may host an application or web-based application that may be used to perform inspections as described herein. In addition, the camera 118, the mobile electronic devices 116, the electronic devices 114, and/or the servers 112 may all communicate with one another via the network 110. For example, one of the mobile electronic devices 116 used to perform an inspection may send the inspection information including images to the servers 112, and may share information related to the inspection with one of the electronic devices 114 (e.g., by sending it an email, by sharing it via a mobile application, etc.).

The mobile electronic devices 116, the camera 118, and/or the electronic devices 114 may also display various information related to the inspections being performed as described herein. For example, these devices may display the various user interfaces shown and described herein (e.g., as shown in FIGS. 4-27 and 30-37). In addition, the various electronic devices may be used to train and implement machine learning models for identifying and assessing damage to objects and property as described herein. For example, the servers 112 may be used to train a model that is stored on one or more of the servers 112 for identifying and assessing damage.

FIG. 1 is merely one example of the types of devices that may be used as described herein. In various embodiments, more or less devices may be used, and some devices, aspects of devices, and/or components of devices may be combined with one another, duplicated, or otherwise varied.

Figure 2:
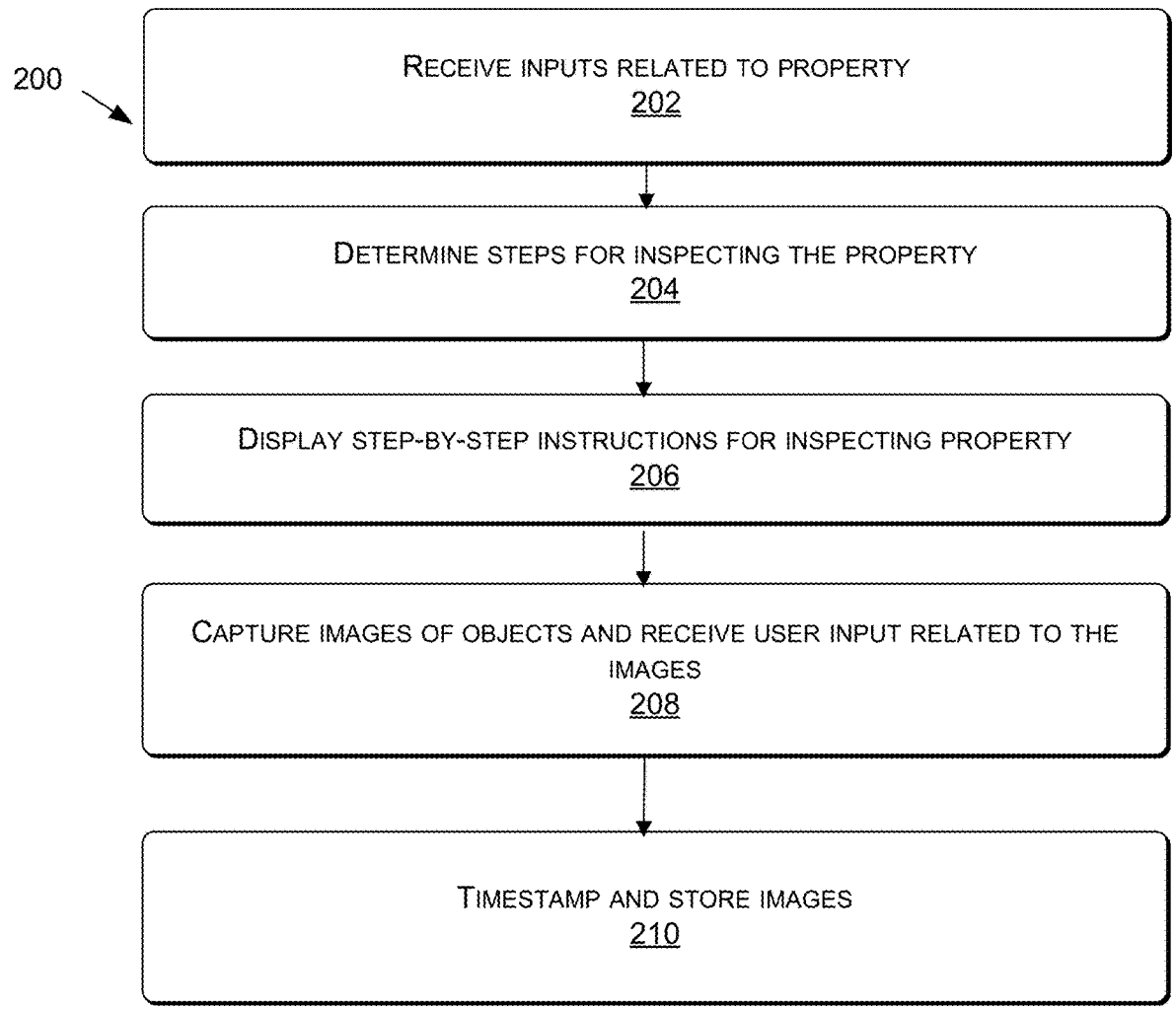
FIG. 2 is a flow chart illustrating an example method of capturing images of a property, in embodiments.

FIG. 2 is a flow chart illustrating an example method 200 of capturing images of a property, in embodiments. As described herein, the method 200 may be implemented in conjunction with various user interfaces displayed on an electronic device (e.g., as shown in FIGS. 4-27 and 30-37) to accomplish the various aspects described herein.

In an operation 202, inputs are received related to a property, such as the type of property (e.g., condo, single-family, multi-family, etc.), how many bedrooms/bathrooms/kitchens/other rooms are in the property, types and quantities of appliances, etc. FIGS. 10-15 demonstrate example user interfaces that may be used for inputting information about a property. Such inputs received at the operation 202 may be received at an electronic device as they are entered by a user, and/or may be sent to and received by another device. For example, another device related to a property (e.g., landlord device, tenant device, property manager device) may receive the inputs, and/or a server used to store the inputs may receive the inputs in addition to the electronic device on which the inputs are originally entered.

In an operation 204, steps for inspecting the property are determined. In an example, the inputs received in the operation 202 are used to automatically determine steps for inspecting the property. For example, steps related to specific rooms, appliances, etc. may be determined based on what the user enters at the operation 202. For example, if the user indicates that there are three bedrooms, inspections steps associated with three different bedrooms may be determined to be steps for the inspection. In addition, the ordering of steps may also be automatically determined at the operation 204. For example, if a user indicates that two bedrooms are located on a top floor of a property and a kitchen and living room is located on a bottom floor, the inspections of the kitchen and living room may be ordered together, and before the inspections of the two bedrooms.

In another example, user inputs may indicate that an oven is present on a property. Thus, an inspection may include a step of turning on an oven to ensure that it works. Because ovens may take a while to heat up, the inspection may be ordered such that the inspection may include the step of turning on the oven, then coming back to the oven after one or more other steps are completed to see if the oven has properly turned on and warmed up. Thus, the steps of the inspection may be ordered such that the user doing the inspection does not waste time (e.g., waiting for the oven to heat up). In some embodiments, an inspection may have been performed at this property previously. In such embodiments, the steps for the inspection may be the same as used for the previous inspection, such that new steps or new orders for the steps need not be determined. In some embodiments, the steps of the inspection may be determined or ordered using the information from the prior inspection. For example, photos related to a certain number of windows of a property may have been taken during a previous inspection. Thus, the system may determine steps for incorporation into a new inspection that includes steps for inspecting and photographing each of the windows that were captured during a prior inspection, even if a user never specifically input a number of windows. Such a determination of steps may also be done automatically. For example, a user may photograph a bedroom and not the windows specifically, but an image recognition process may identify windows in the photograph. Accordingly, steps for inspecting those windows may be added during an inspection or for a subsequent inspection.

Other sources of information may also be used to automatically determine steps for an efficient and accurate inspection. For example, inputs from the user or elsewhere indicating what rooms and/or objects are on what story of a property, unique features of a property, digital floor plans, 3-D camera/walkthrough image captures, a walk-through path through the property, etc. may all be used to improve an automated determination of steps for an inspection. An address or other location based information may also be used to search or otherwise scrape the internet or other data sources for information about a property (e.g., information about land boundary lines, floorplans, square footage, number of bedrooms/bathrooms, etc.). Thus, multiple inputs and sources of information may be used to generate the steps of an inspection. Some electronic devices and software stored thereon are also capable of determining very exact geographic locations. Such features may be used to map out a path taken by a user during an inspection, and may be correlated to the objects inspected at any given time. Using this information, a rough map of the property and where each object is, where each room is, etc. The system may use this information to order the steps for a subsequent inspection, to optimize the order of the steps to reduce the amount by which the user has to walk around, to check the location of a user during subsequent inspections to make sure it matches the location of objects determined from a previous inspection, etc.

In an operation 206, the step-by-step instructions for inspecting the property are displayed on an electronic device (e.g., a mobile device like a smartphone or tablet) so that the user can complete the inspection. Examples of user interfaces that may be used to display step-by-step instructions may include the user interfaces shown in FIGS. 16-27. A user may complete the step-by-step instructions by, for example, answering prompts displayed on a user interface, entering notes related to aspects of a property being inspected, taking photographs of objects on the property, identifying damaged portions of objects in the photographs, etc. as described herein.

In an operation 208, images of objects are captured and user inputs related to those images are received. Those images and inputs may be received by a mobile electronic device, and may also be transmitted to and received by other electronic devices, such as servers, email addresses, tablets, laptops, desktop computers, etc.

In an operation 210, the images captured are timestamped and stored. The images may be timestamped at or near the moment the images are captured. The images may be stored in memory of a device which captured the images. In various embodiments, the images along with their timestamps may be stored in other devices such as servers. When the images and timestamps are stored in a server, they may be accessible to other electronic devices (e.g., devices associated with a tenant, landlord, property manager, etc.).

In various embodiments, the method 200 may be implemented in an online or offline setting. For example, in an online mode, if the device capturing images and receiving inputs is connected to the internet, a server or other device may be updated with the images and inputs as they are received. In an offline mode, the images and inputs may be stored locally until they can be transferred to another device either through an offline or online connection. Furthermore, an application may be downloaded that may allow a user to complete an inspection and any of the operations of the method 200 in offline because the necessary software is downloaded to the user's electronic device. In an offline mode, each of the operations may occur at the user's electronic device (e.g., a mobile electronic device such as a smartphone or tablet). In an online mode, some of the operations in the method 200 may be performed in whole or in part on more than one electronic device. For example, a server may also receive the inputs that user inputs into their device at the operation 202 and use those inputs to determine the steps and/or order for the steps for inspecting the property at the operation 204. In another example, another electronic device such as a server may timestamp and/or store the images at the operation 210.

Figure 3:
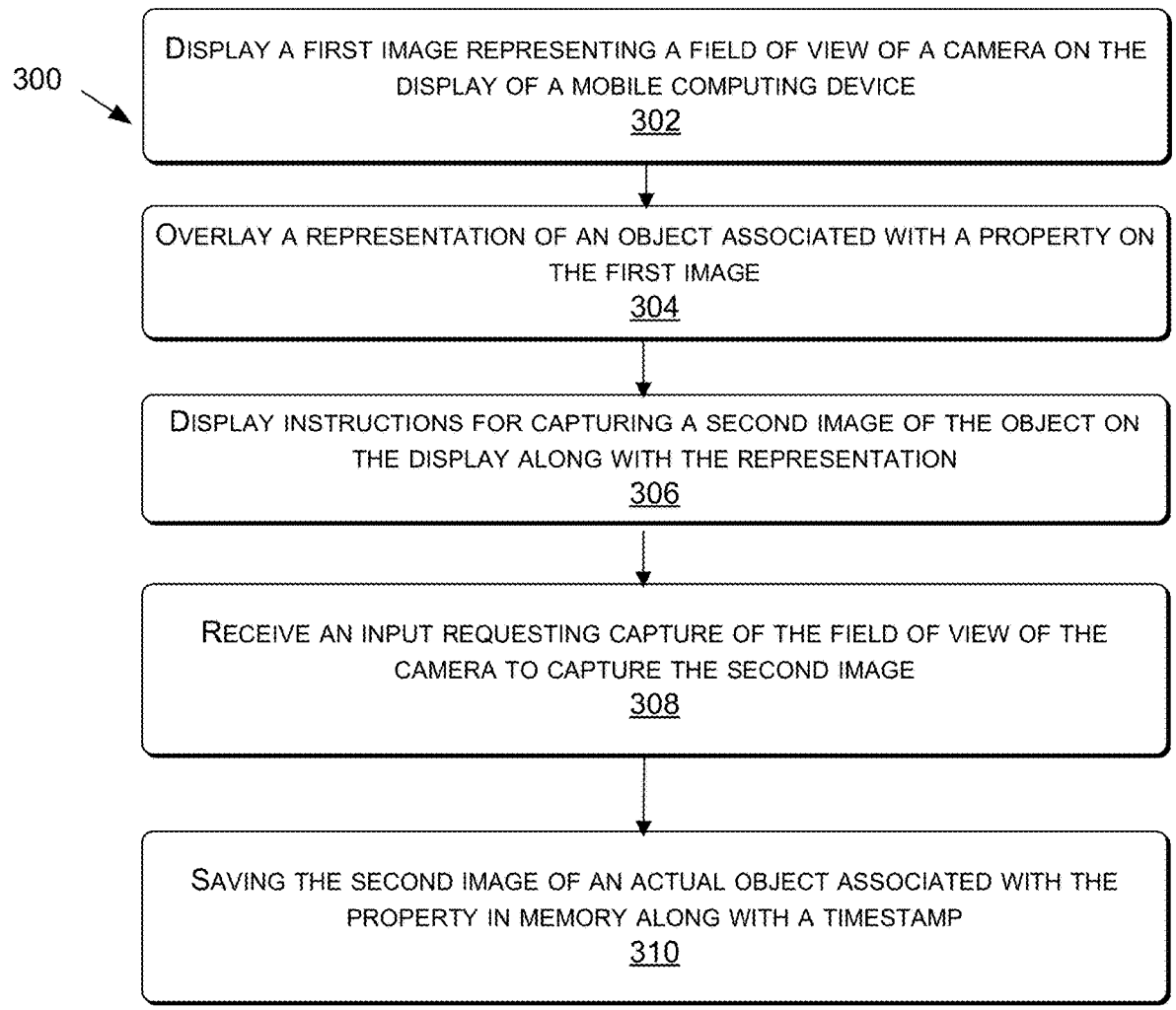
FIG. 3 is a flow chart illustrating an example method of overlaying a representation of an object and instructions for capturing an image on a display of a computing device, in embodiments.

FIG. 3 is a flow chart illustrating an example method 300 of overlaying a representation of an object and instructions for capturing an image on a display of a computing device, in embodiments. Example user interfaces showing an overlay according to the example method 300 are shown in FIGS. 19, 21, 23, and 30-37.

In an operation 302, a first image representing a field of view of a camera is displayed on a display of a mobile computing device. The mobile computing device may be, for example, the mobile electronic devices 116 of FIG. 1. As shown in FIG. 19, for example, whatever the camera is pointing toward may be shown on the display of an electronic device. As a user moves the electronic device and the field of view of the camera changes, so too will the image displayed on the display change.

Figures 30, 31:
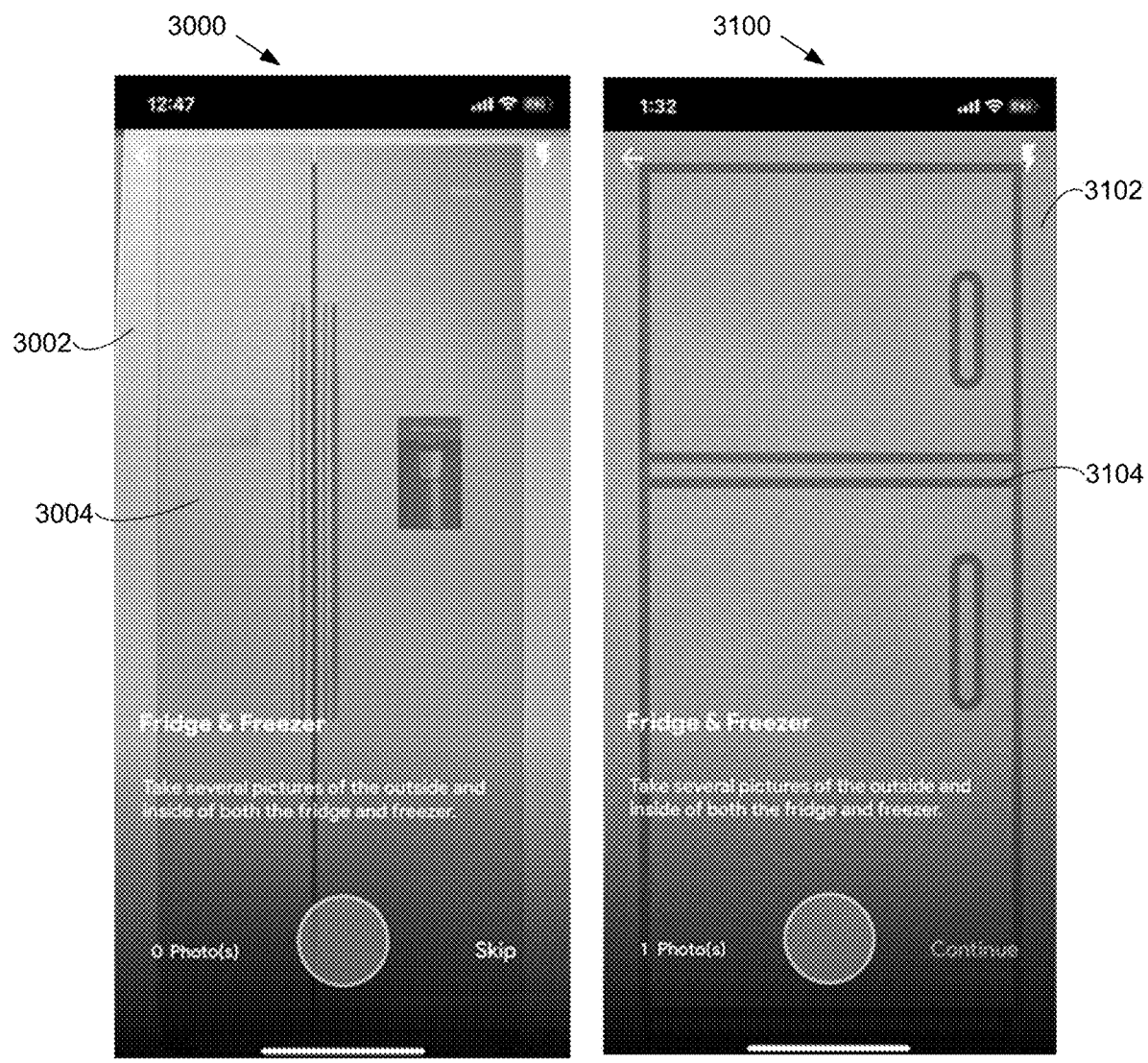
FIGS. 30 and 31 are example user interfaces for overlaying a representation of an object onto a user interface of a mobile computing device, in embodiments.

In an operation 304, a representation of an object associated with a property is overlaid on the display that is also displaying the first image. As shown in FIGS. 30 and 31, for example, an outline or an actual image representation of an object may be overlaid onto an image. In the examples of FIGS. 30 and 31, the representation is that of a refrigerator. The representation may be partially transparent or opaque so that features of the first image are partially visible as the first image is displayed. In this way, the user can align the representation with the object shown in the first image that is being inspected/documented. This technical aspect of the methods and systems described herein advantageously leads to more consistent images being taken by a user, so that the images are more useful for comparison to previous images taken over time, more useful for automatically determining material damage to an object versus wear and tear, and/or more useful for estimating the cost of any material damage or wear and tear.

In addition, partial representations of objects may also be overlaid onto the first image in various examples. For example, a step of an instruction may be to take a picture of the inside of a refrigerator, microwave, oven, etc. Thus, the representation may only show a portion of object so that the user may focus the image properly and get a desired angle for the portion of the object being inspected/documented.

In an operation 306, instructions for capturing a second image may be displayed on the display along with the representation and the first image. Examples of such instructions are shown in FIGS. 19, 21, 23, and 30-37. In FIG. 19, for example, instructions state "Front Door Exterior—While standing outside the front door, take a picture of the entire front door." By displaying the instructions along with the first image representative of the field of view of the camera and a representation of an object to be photographed, better quality and more useful photographs may be obtained regardless of the level of skill or training of an individual carrying out an inspection.

In an operation 308, an input requesting capture of the field of view of the camera to capture the second image is received. In other words, the user makes an input to actually capture and store a photograph representative of the first image current displayed and capturing the current field of view of the camera. The user may make the input to actually take the photograph once the instructions are properly followed and/or the representation properly aligns with the object being photographed.

In an operation 310, the second image captured by the camera that includes an actual object associated with the property in response to the input is saved along with a timestamp. The second image is saved without the representation or the instructions overlaid. However, in various embodiments, the second image may be saved with the representation and/or the instructions overlaid, or the instructions and/or representation may be saved along with the image, though not overlaid on the image. In some embodiments, the image may be saved along with a tag or label that indicates the actual object captured in the photograph. Other tags or labels may indicate the instructions presented to the user and overlaid on the first image, the representation presented to the user and overlaid on the first image, the timestamp, and/or any other information related to the photograph (device that took the photograph, geographic location where the photograph was captured, etc.).

Thus, the second image, at least in part due to the instructions and/or the representation overlay, is configured such that the second image capture is comparable to a third image captured of the actual object at a different time from when the second image was captured. As described herein, such images may be compared to detect damage, assess the extent of such damage, inventory objects on a property, etc. In various embodiments, that comparison may take place on various electronic devices. For example, the comparison may take place on the user's device, at one or more servers, on another electronic device, or on any combination thereof. Where the comparison is performed on a different device from where the second image was captured, the second image may be transmitted to a second computing device where the comparison occurs. In some embodiments, a prior image of the actual object captured may also be used as the representation that is overlaid when capturing the second image. In this way, accurate images may be gathered, as a user will be instructed to capture an actual object by aligning a different image of that same actual object when capturing the second image.

FIGS. 4-27 are example user interfaces for inspecting a property and capturing images of the property, in embodiments. Each of the user interfaces described herein may be displayed, for example, on a mobile electronic device such as a smartphone. However, the user interfaces may also be displayed on a tablet or other electronic device in a similar or modified manner. In any event, the user interfaces may be displayed on mobile devices so that the user interfaces may be used by a user while walking around a property to perform an inspection and capture images as described herein.

Figure 4:
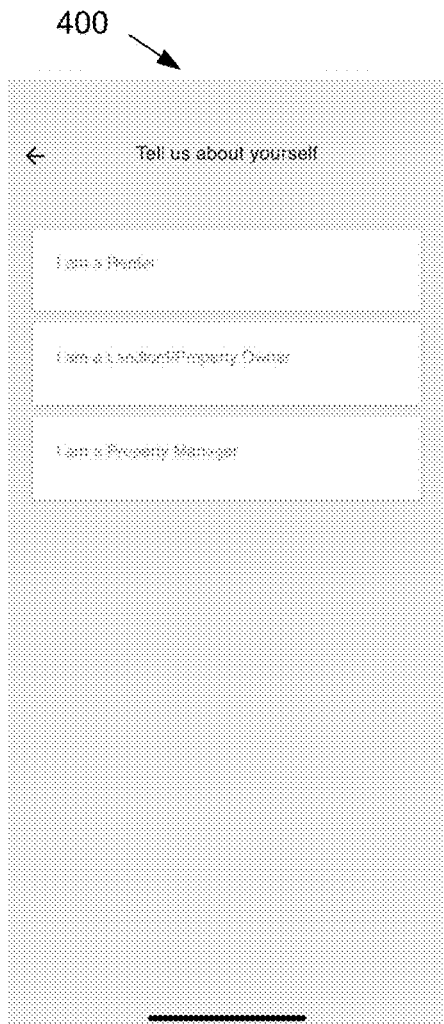

FIG. 4 shows a user interface 400 that allows a user to input what type of user they are. The user interface 400 includes options for renter, landlord/property owner, and property manager. The input may be used to determine what types of other interfaces are shown to the user. For example, a user who is a property manager may have access to inspection information for multiple properties that they manage, while a renter may only have access to inspection information for a property which they are currently renting, and that inspection information may only be available to the renter that is associated with the time in which the renter was actually renting the property. Other user interfaces, not pictured, may be used similar to the user interface 400 for receiving other inputs about a user, such as information about properties associated with a user, name of user, contact information of user, financial account information of a user, username/password information of a user, home/billing/contact address of a user, etc.

Figure 5:
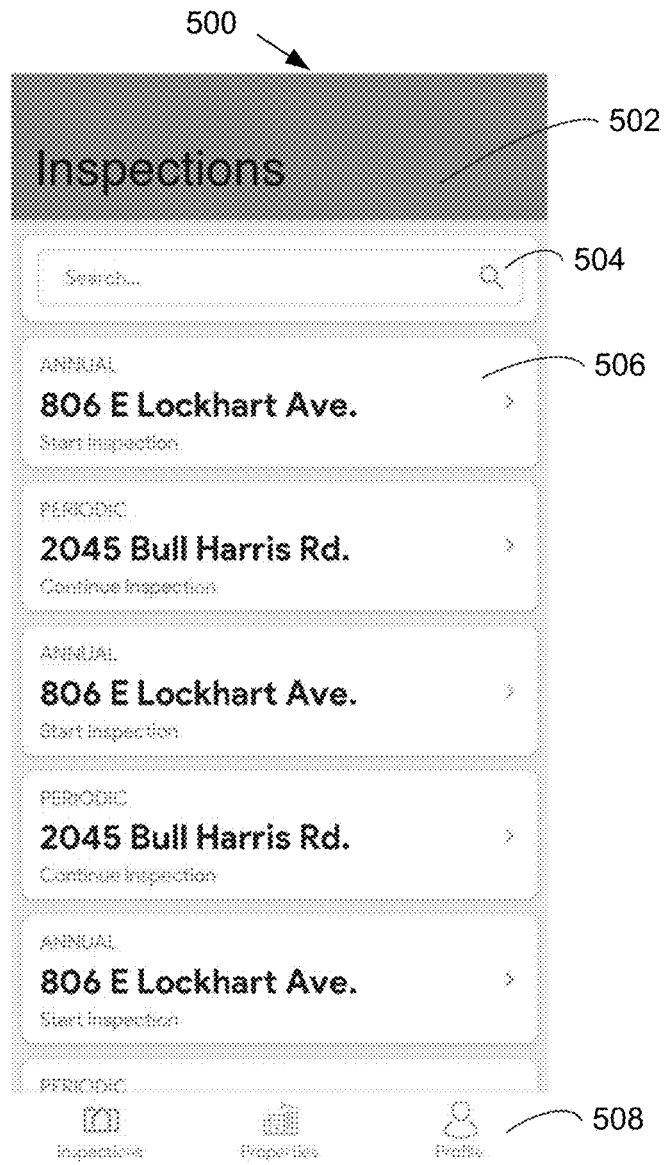

FIG. 5 shows a user interface 500 that lists inspections 502, as an inspections icon is selected in the tabs 508 at the bottom of the user interface. The user interface 500 may be shown to a property manager or landlord who is responsible for completing various inspections, the user interface 500 may be shown to a property manager or landlord who has pending inspections to be completed by others (e.g., the renter or an employee), or any combination thereof. Thus, a landlord or property manager may be able to keep track of inspections that both they and others are supposed to perform for various properties.

The user interface 500 may include a search dialog 504 for searching the properties for which related inspections are occurring, will occur, or have occurred. Inspection indicator 506 shows an example of an inspection that has yet to be started, and may be started by selecting the inspection indicator 506 (as indicated by the "Start Inspection" text that occurs in the inspection indicator 506. The inspection indicator 506 also indicates the type of inspection being performed, such as an annual or periodic inspection. Other inspection types may also be used, such as move-in, move-out, before-remodel, post-remodel, post-repair, etc., so that the property and its various objects may be properly tracked for proper recordkeeping and tracking over time. As also shown in the user interface 500, other inspection indicators may indicate inspections at various states of completion (e.g., "Continue Inspection"). Other state indicators could be "In-Progress," "Completed," "Not Started," etc.

If the properties button in the tabs 508 is selected in the user interface 500, a user interface such as the one shown in FIG. 7 may be displayed. If one of the inspection indicators (e.g., 506) are selected, an interface such as that shown in one of FIG. 6, 8, or 16-18 may be displayed. In various embodiments, the user interface 500 may include a button (not shown) similar to the button 706 of FIG. 7. The button may be used to add new inspections to an inspection list.

FIG. 6 shows a user interface 600 for a periodic inspection, for example if an inspection indicator in FIG. 5 is selected. The user interface 600 includes a back arrow 602 that may navigate the user back to the user interface 500 of FIG. 5. The user interface 600 further includes information 604 about the inspection, such as the address of the property, a status of the inspection (e.g., in-progress, not started, completed, etc.), a due date of the inspection, an email address of a person the inspection is sent to. In this example, the user interface 600 is an example of an interface a landlord or property manager may see after having sent or assigned an inspection request to an employee or the renter. The landlord or property manager may then see in the user interface 600 the status of the inspection. In other examples, similar interfaces to that of FIG. 6 may be used for a user to see the progress of an inspection they have responsibility for completing.

The user interface 600 further includes a progress bar indicating a percentage of items or steps from the inspection that are complete. The inspection category indicator 608 further shows additional details about the inspection in progress. In particular, the category indicator 608 shows that three out of three steps relating to inspecting the front door are complete. Such steps, as described herein, may include steps such as capturing one or more images of the front door, indicating a condition of the front door, recording notes about the front door, or any other inspection step related to the category. Other categories for the inspection shown in the user interface 600 include kitchen, bedroom, bathroom, half bathroom, and dining room. Other categories or subcategories may also be shown in other embodiments. In the user interface 600, the bedroom is shown as zero out of three steps being completed. Accordingly, as a user completes an inspection, a server may be updated as different steps are completed so that a landlord or property manager may see the completed steps as indicated in the user interface 600. If a user selects one of the category indicators, such as the category indicator 608, that is already completed or partially completed, the device may display information recorded as part of the inspection.

FIG. 7 shows a user interface 700 that lists properties visible to a user such as a landlord or property manager. A search dialog 702 may be used to search for a desired property, and a button 706 may be used to add properties to the list. Selecting the button 706 may cause the device to display an interface for entering new information about a property, such those shown in FIGS. 10-15. The tabs 708 may also be selected to navigate back to particular inspections or to navigate to a user profile. The tabs 708 shows that properties are currently selected and being displayed.

Figures 8, 9:
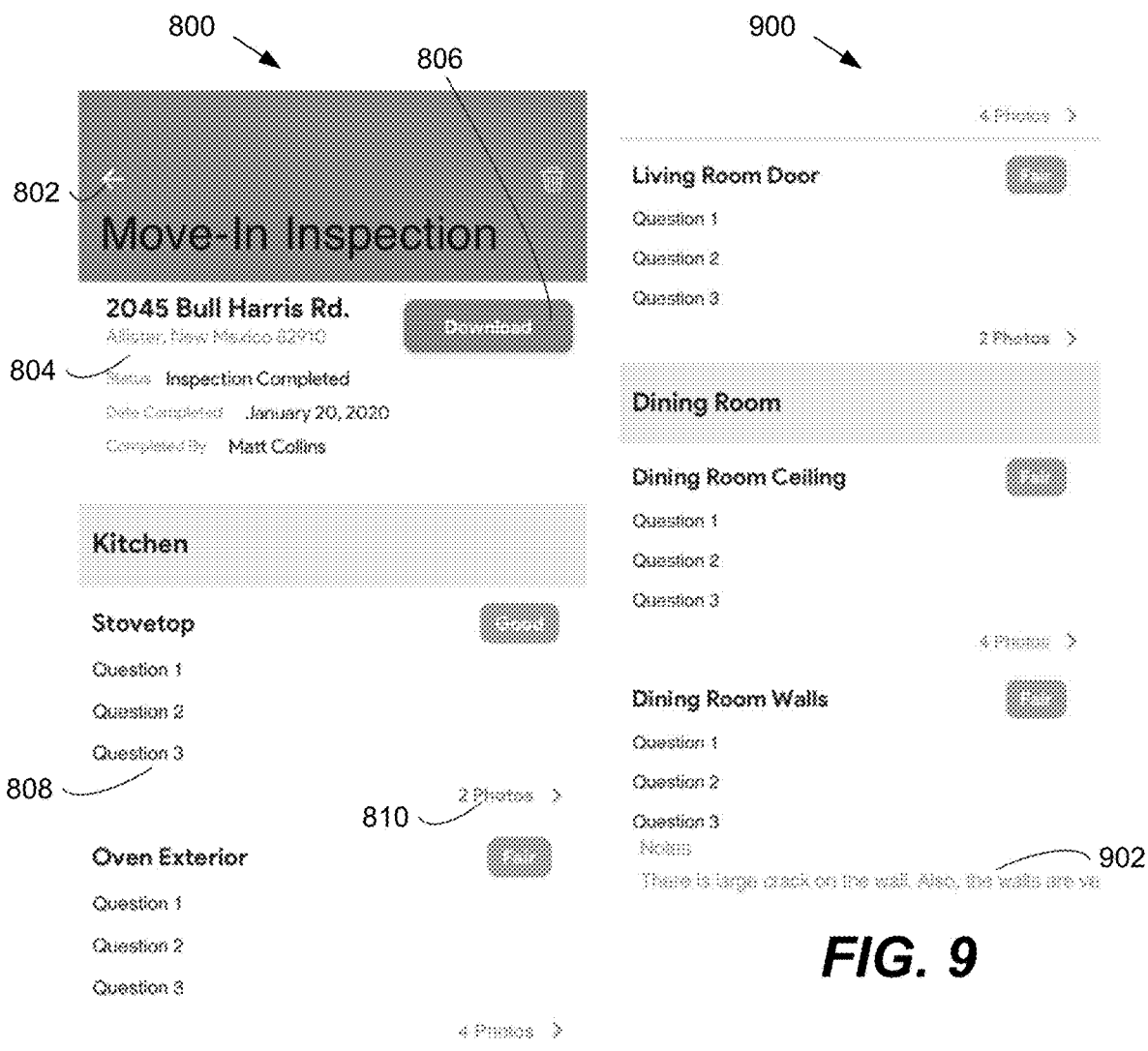

FIG. 8 shows a user interface 800 for a move-in inspection that has been completed. The user interface 800 may be navigated to, for example, if a completed inspection is selected at the interface 500 of FIG. 5. A back arrow 802 may be used to navigate back to a list of inspections such as that of FIG. 5. Information 804 may indicate details of the selected inspection, such as a status (e.g., inspection completed), the date completed, and who completed the inspection. The user interface 800 further includes a button 806 for downloading the information associated with the inspection, such as the answers to prompts, any notes/comments, and any images captured. In other words, a user may download a complete copy of an inspection by pressing the button 806. The button 806 is therefore helpful because a user does not have to download every part of an inspection (e.g., image files which may be large) to view the user interface 800 and see the general results of an inspection. In addition, a user may select to view photos of specific aspects using, for example, a button 810 and only download or view photos associated with certain aspects than viewing and downloading all images. In addition, images displayed without downloading the entire report may be smaller in size (e.g., thumbnails) than images stored somewhere else (e.g., on a server) so that the user will be able to more quickly and easily download and view specific images than if the larger images are downloaded/viewed. In addition, the information 808 may show a rating of the item (e.g., good, fair, poor) and may show questions and a user's answers to those questions based on the inspection (e.g., does stovetop turn on—yes/no). Then, by selecting the button 810, photos captured of the stovetop may be viewed.

A user interface 900 of FIG. 9 shows another portion of the inspection results related to the inspection results shown in FIG. 8 if the user scrolls down. In other words, additional aspects of an inspection may be available by scrolling or otherwise adjusting the user interface of the electronic device. In addition, an example custom note 902 is shown in the user interface 900. Custom notes may be added by a user performing an inspection to further explain a photo, a rating of an item, or otherwise describe something related to the inspection step. For example, the custom note 902 describes a large crack in a wall. Other custom notes may indicate that an object is missing or the user could not find the object, may describe damage, may describe that the object is in good shape, or needs a new coat of paint, needs replacing, needs repairs or a replacement part, etc.

FIG. 10 shows a user interface 1000 that displays information related to a property. The user interface 1000 includes an address 1002 of the property, a style 1004 identifying a type of the property (e.g., apartment/condo, etc.), property details 1006, and lease terms 1008 associated with the property. The user interface 1000 also includes a delete button 1010 for removing a property from a list of properties, for example if a landlord sells a property or a tenant using the application moves out of a property.

The user interface 1000 includes an edit property button 1012 so that inputs about the property may be added, changed, or deleted. Such inputs may be entered, for example, at the operation 202 of the method 200 in FIG. 2 and used to determine steps for an inspection as in the operation 204. Selecting the edit property may also cause a different user interface, such as the interfaces of FIG. 11 or 12.

FIG. 11 shows a user interface 1100 that may be displayed, for example, if the edit property button 1012 is selected in the user interface 1000. The user interface 1100 includes a property selection interface 1102 where a user may select which type of property it is, and also includes dialogs 1104 and 1106 for entering a security deposit and rent amount associated with the property. A save button 1108 may be selected by the user to save changes to the property. The property details 1110 show various details of the property, such as how many bedrooms, bathrooms, common areas, additional rooms, outdoor areas, etc. are associated with a property. These details may be selected to input additional information about the aspects of a property or change previously input information. As described herein, this information may be used to determine steps for a step-by-step inspection process.

Figures 12, 13:
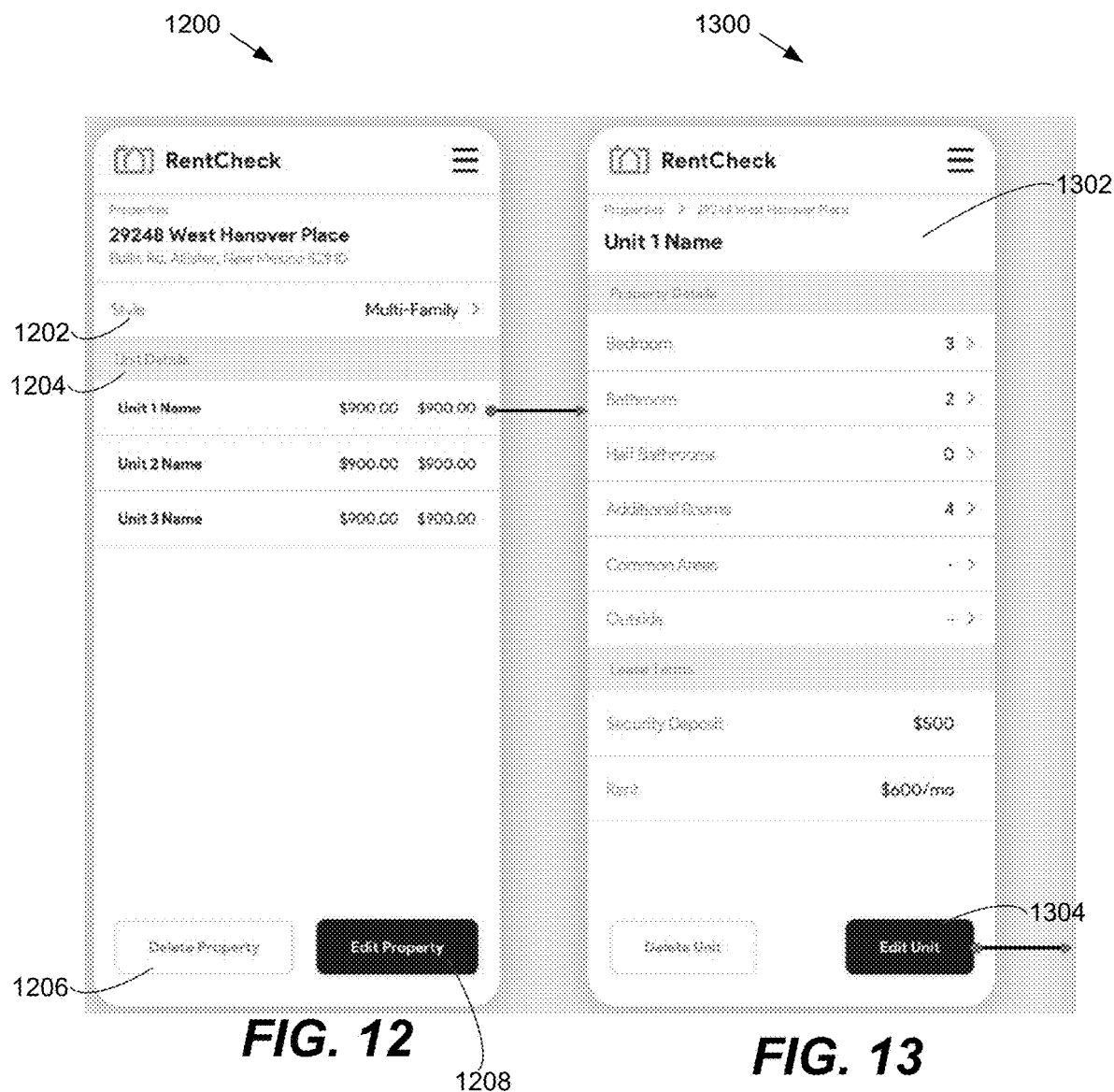

FIG. 12 shows a user interface 1200 that may be shown if a selected property (e.g., as selected from the user interface 700 of FIG. 7) is a multi-family property that has multiple units. In another embodiment, the user interface 1200 may be shown if a user selects "Multi-Family" in the property selection interface 1102 of FIG. 11. In the user interface 1200, a user may change the style of the property again by selecting style button 1202, or may adjust unit details of the various units within a multi-family property in the unit details 1204. In addition, a button (not shown) may be displayed as part of the user interface 1200 to add units to a multi-family property. In the example of FIG. 12, the property has three different units, and the user interface 1200 shows each of the names, the rents, and the security deposits associated with each unit. To edit unit information, a user may tap, click, highlight, or otherwise select one of the units in the unit details 1204, and then select an edit property button 1208. To delete a unit, the button 1206 may be selected after a unit is selected.

Upon selection of a unit for editing, a user interface 1300 of FIG. 13 may be displayed. The user interface 1300 is similar to the user interface 1000, except that the user interface 1300 is related to one unit of a multi-family property, instead of a single-family property. A unit name 1302 is displayed to identify which unit was selected. If an edit unit button 1304 is selected, a user interface 1400 of FIG. 14 may be displayed for editing details of the unit.

The user interface 1400 is similar to the user interface 1100 of FIG. 11. In other words, a similar interface for entering similar information may be used whether a property is a single family or a unit of a multi-family property.

Figures 14, 15:
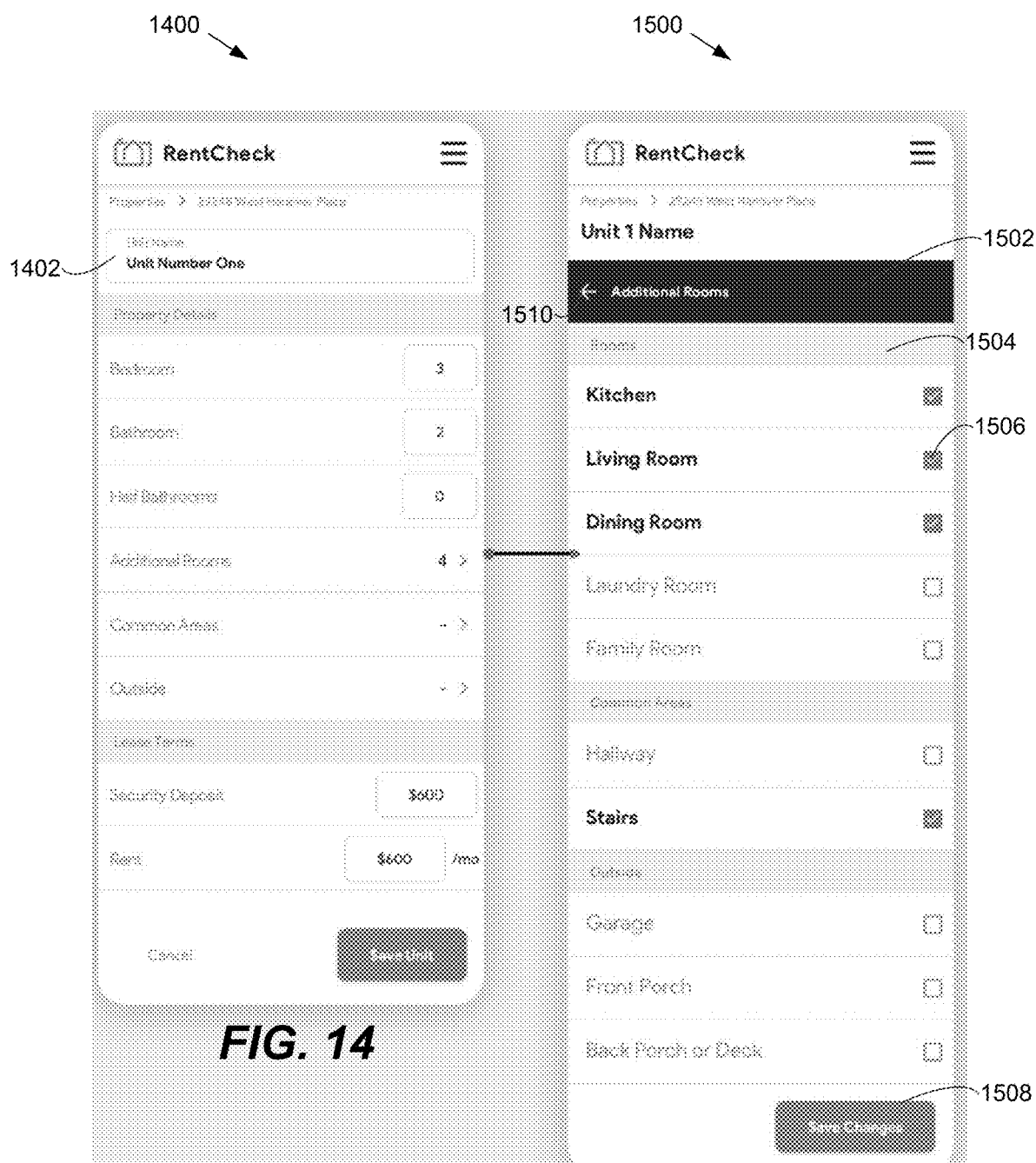

The user interface 1400 includes a dialog 1402 for changing a name of the unit. The property details aspects may also be selected to navigate to a user interface 1500 as shown in FIG. 15. For example, the user interface 1500 may be shown after user selection of the "Additional Rooms" portion of the property details. An interface similar to that of FIG. 15 may also be displayed and used when a user selects one of the property details 1110 of FIG. 11. The user interface 1500 includes an indicator 1502 that "Additional Rooms" has been selected for editing/inputs, and also includes a button 1510 for going back to the user interface 1400.

The user interface 1500 further includes headings such as a heading 1504 to indicate other property details that may be edited, such as common areas, outside, etc. The user may scroll to different property details sections in FIG. 15 rather than selecting them in FIG. 14. In any event, additional rooms may be indicated by selecting checkboxes such as a checkbox 1506. In other embodiments, other types of inputs may be used. For example, in the user interface 1400 of FIG. 14, a user may enter a number of bedrooms, bathrooms, etc. instead of going to a separate interface to enter inputs about a property. In another example, a user may manually enter an additional room or aspect of a property that is not otherwise listed on the user interface 1500.

Figure 18:
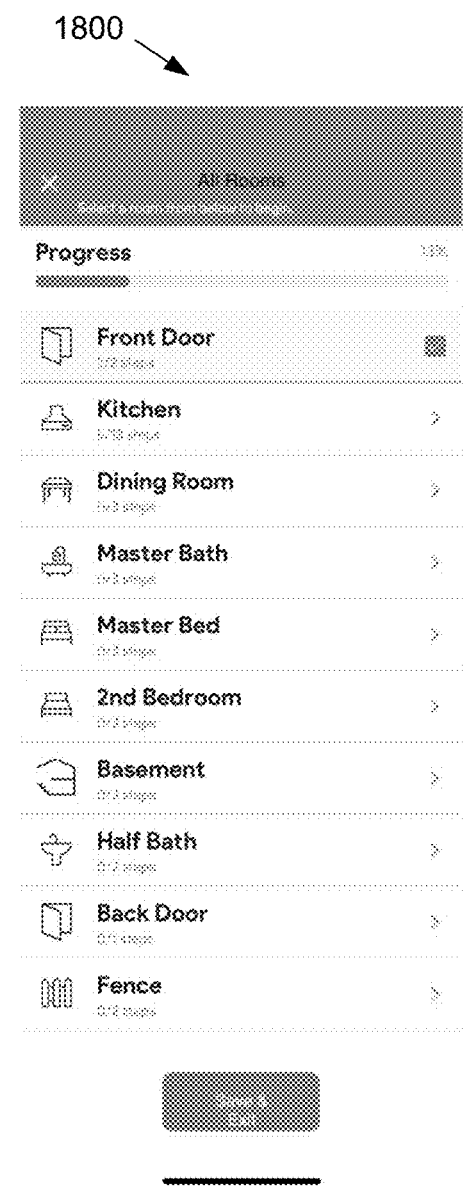

FIGS. 16-18 show user interfaces, 1600, 1700, and 1800, respectively, for performing an inspection of a property (e.g., after steps for an inspection are determined at the operation 204 of FIG. 2). The user interface 1600 shows an example user interface of a summary of an inspection that has not yet begun. Icons such as an icon 1602 shows different portions of a property that are to be inspected. The icon 1602 is related to front door, and shows that zero out of two steps related to the front door have been completed. A progress indicator 1604 shows that zero percent of the inspection has been completed. As described herein, a landlord, renter, property manager, or other person related to these parties may perform an inspection and therefore view the user interfaces in FIGS. 16-18 (and the user interfaces that are accessible therefrom as described herein). A button 1606 provides for a user to save the current inspection as-is (even if it is not yet completed) and exit the active inspection interface.

The user interface 1700 includes an icon 1702 that has changed color to show that all steps associated therewith are complete. In particular, the icon 1702 shows that two of two steps associated with the front door are complete. The changing of color allows a user to quickly and easily see how much of the inspection is completed and what aspects of the inspection are and are not completed.

The user interface 1800 shows a similar progress of an inspection as shown in FIG. 17, but in a different format. In particular, the sections of the property inspection are organized in a list rather than tiled icons. In addition, instead of changing a color of an entire icon for a completed aspect of an inspection, a check box is shown next to a completed item or group of steps for the inspection.

FIG. 19 shows a user interface 1900 for taking a picture of a front door exterior. In particular, the user interface 1900 includes a first image 1902 being displayed that represents a field of view of a camera of a mobile electronic device that is being used to perform the inspection. As the mobile device moves, its camera and an associated field of view will move, changing the first image 1902 being displayed on the display shown as the user interface 1900. This occurs so that the user can look at the first image 1902 to make sure they properly capture an aspect of the property as desired. For example, in FIG. 19, instructions 1904 overlaid onto the first image 1902 explain to the user what to take a picture of. While the user interface 1900 does not show a representation of the front door for aligning a photograph, such a representation may optionally be overlaid as described herein. A user may press a button 1906 to capture a second image that coincides with the first image currently being displayed at the time the button 1906 is pressed. In the alternative, the user may select a skip button 1908 to skip capturing an image at this stage.

Once the button 1906 is selected and the second image is captured, a user interface 2000 of FIG. 20 may be displayed. The user interface 2000 includes a thumbnail 2002 of the second image captured based on the selection of the button 1906. The user may be able to add further photos of the front door exterior by selecting an add photo button 2010. The user may also select an overall condition button 2004 (e.g., poor, fair, good) relating to the front door exterior. In the dialog 2006, a user may input a note or comment about the door. Once an image is properly captured and a condition button 2004 is selected, a button 2008 may change state or color to allow the user to move to the next step in the inspection (e.g., front door interior).

FIG. 21 shows a user interface 2100 similar to the user interface 1900, but for the front door interior (e.g., the next step in the inspection). A user interface 2200 of FIG. 22 is similar to the user interface 2000 of FIG. 20, but shows that a user may select a button 2202 in a thumbnail of a captured image to delete it, for example if the image is not of high quality or does not properly capture the desired object. Upon selecting the button 2202, a dialog 2204 may be displayed asking the user to confirm whether they would actually like to delete the photo, which the user may do by selecting a button 2206.

Figure 23:
Figure 24:
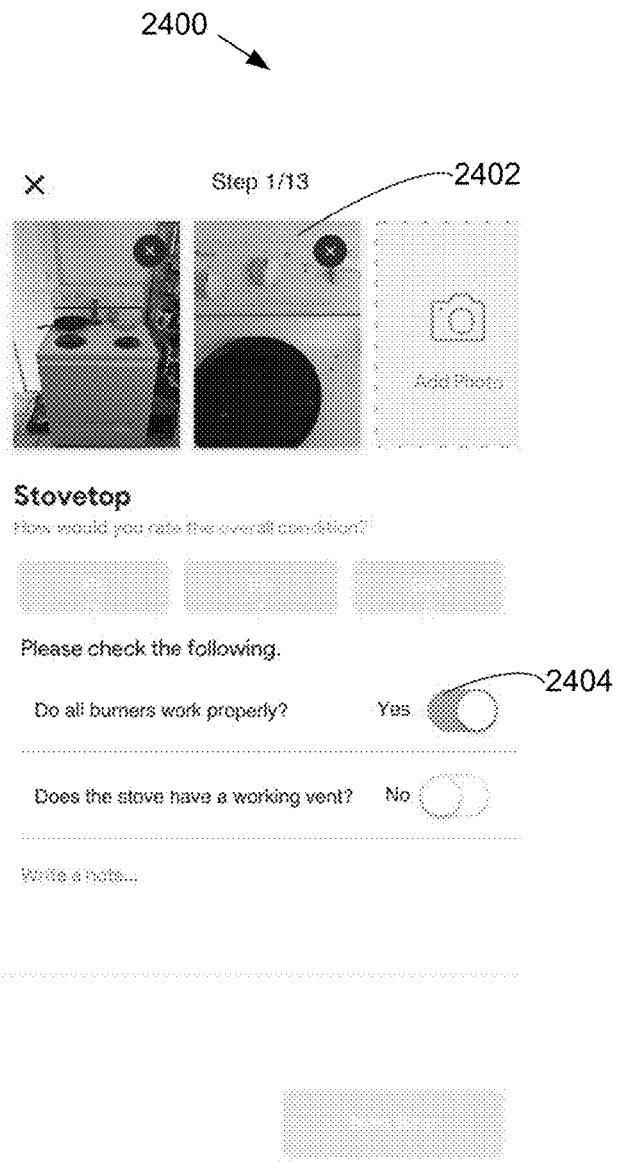

FIG. 23 shows a user interface 2300 that is similar to the user interfaces 1900 and 2100 but for a stovetop. FIG. 24 shows a user interface 2400 that is similar to the user interface 2000, except it has additional questions about the object and shows that the user has taken an additional photo 2402 of the object, such that there are two photos related to the stovetop. Although not shown, those two photos may be captured using different overlaid instructions and/or representations over an image representing a field of view of a camera of a device (e.g., as shown in the user interface 2300). The user interface 2400 further includes a toggle button 2404 so the user can indicate specific information about the object (e.g., do the burners work properly). In other embodiments, different types of inputs than a yes/no toggle may be used for a user to input information (e.g., how many of the burners work and the user may enter a number). In various embodiments, a user may be prompted to leave a note/comment if an answer to a question is a particular answer. For example, if the user indicates that not all the burners of a stovetop work, the user may be further prompted to write more information (e.g., whether some or none of the burners work, any other problems noted with the stovetop, efforts taken to get the stovetop to work, etc.)

Figure 25:
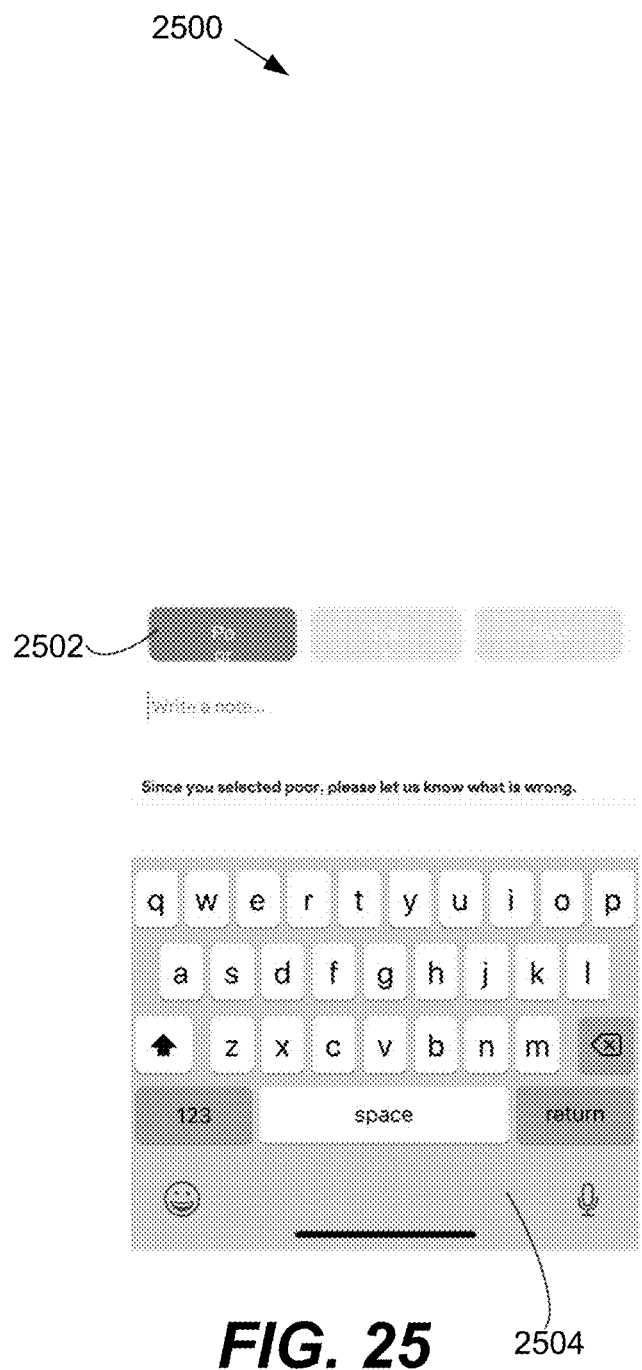

FIG. 25 shows a user interface 2500 for prompting a user to leave a note/comment because they indicated that the condition of an object was poor by selecting a button 2502. Upon selecting the button 2502 or otherwise selecting a field for entering a note/comment, a keyboard 2504 may be displayed on the user interface 2500 so that the user may enter a note/comment. In this embodiment, the user is only specifically prompted to leave a note/comment because they selected that the condition of an object was poor. However, in other embodiments, a user may or may not be prompted to leave a note/comment based on other criteria. In some embodiments, a user may not be able to proceed to the next step of an inspection if they do not enter a note/comment when prompted.

Figures 26, 27:

FIG. 26 shows a user interface 2600 that includes additional questions and a photo related to an oven interior. Although not all steps for completing an inspection are demonstrated herein, other aspects of a property or objects thereon may be inspected, with the user capturing images and entering information about those aspects of the property or objects similar to the other user interfaces described herein.

FIG. 27 shows a user interface 2700 that may be displayed after a last step of an inspection is completed. The user interface 2702 shows a progress bar 2702 that is at one hundred percent. The user interface 2704 further includes instructions 2704 for finalizing the inspection, including how to go back and review the inspection details, how to sign using the signature field 2706, and how to submit the inspection using button 2708. Selecting the submit button 2708 may cause the inspection details to upload to a server if the electronic device is online or otherwise in communication with a server. If the electronic device is not online or in communication with the server, the electronic device may save the inspection details after the user selects the button 2708 and upload the information to server once the electronic device is online or otherwise in communication with the server.

Figure 28:
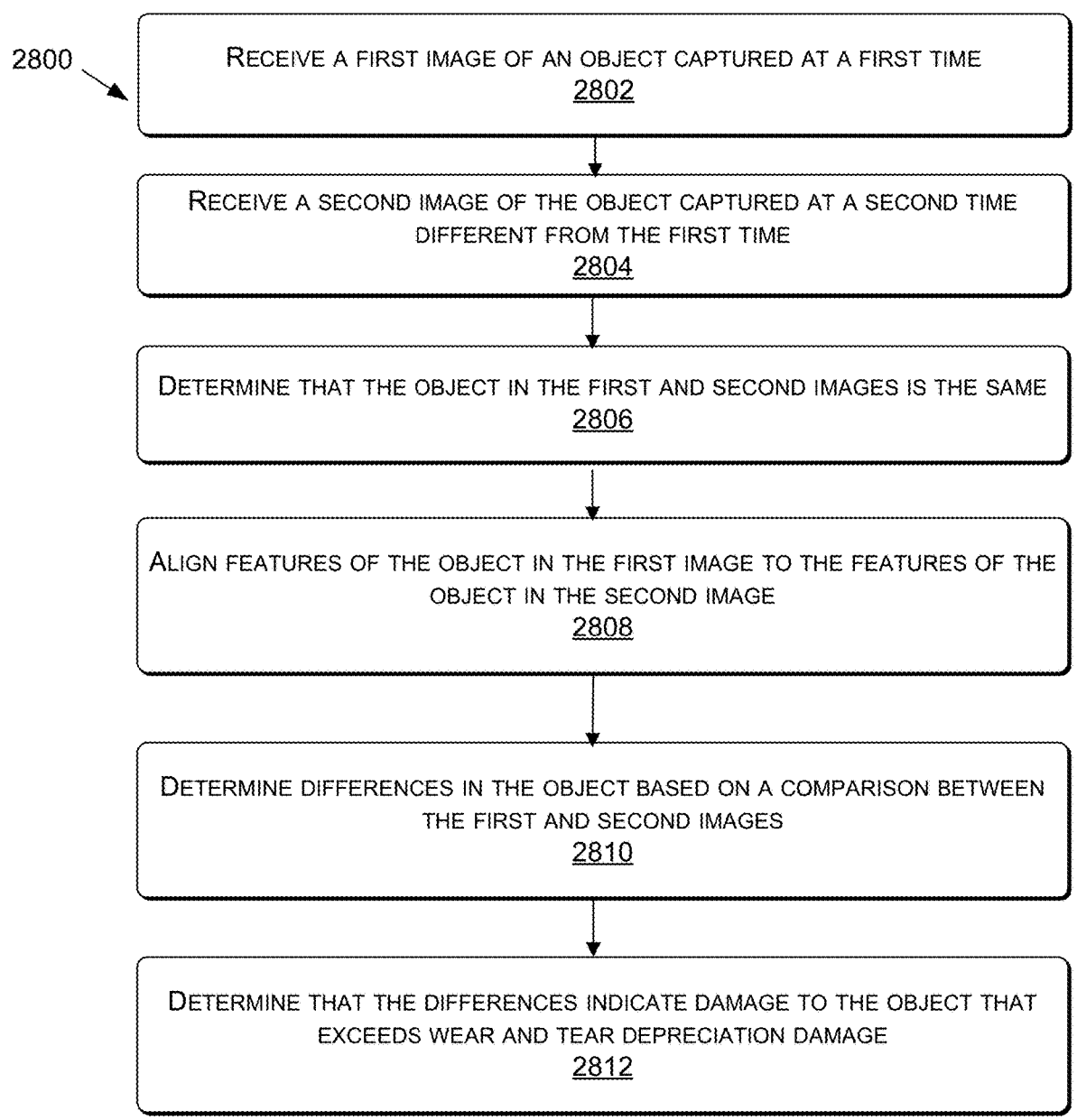
FIG. 28 is a flow chart illustrating an example method of determining whether damage to an object exceeds expected wear and tear depreciation damages, in embodiments.

FIG. 28 is a flow chart illustrating an example method 2800 of determining whether damage to an object exceeds expected wear and tear depreciation damages, in embodiments. As described herein, a user may capture images of various objects or aspects of a property during a property inspection. In addition, other images may be captured of those objects or aspects of a property during subsequent inspections. As described in the method 2800 those subsequent images of a same object may be compared to determine changes to the object, which may be wear and tear due to normal use and passage of time, or may be material damage for which a tenant should be liable for repairs or replacement of the object. As described herein, the method 2800 may be implemented by an electronic device such as a server to automate the process of detecting damage and assessing damage for which a tenant should be liable, or depreciation due to wear and tear (a value that may still be of use to a landlord or property owner).

In an operation 2802 of the method 2800, a first image of an object is received, the first image being captured at a first time. A first image of an object may be received by virtue of a user using an electronic device to capture an image (e.g., as shown in FIG. 19-26 or 30-37), or a first image may be received by a server or other electronic device from a device that was actually used to capture the image.

In an operation 2804, a second image of the object is received, the second image being captured at a second time different from the first time. Similar to the first image, the second image of an object may be received by virtue of a user using an electronic device to capture an image (e.g., as shown in FIG. 19-26 or 30-37), or the second image may be received by a server or other electronic device from a device that was actually used to capture the image. The first and second images in this embodiment are captured at different times. For example, the first image may be captured at or near a time when a tenant/renter moved into a property (or unit of the property), and the second image may be captured at or near a time when a tenant/renter moved out of the property. In this way, the images may represent what the object was like when the tenant/renter moved in and what the object was like when they moved out.

In an operation 2806, the object in the first and second images is determined to be the same object. This may be done by inferring that the images captured the same object based on how the images were captured, saved, characterized, etc. In other words, if the object is properly captured during subsequent inspections, the images may be saved with tags or other metadata indicating that the images are of the associated object. Accordingly, the system may rely on how those images are saved (e.g., the metadata associated with the images) to determine that the images captured the same actual object on the property. In other embodiments, the system may perform an image analysis to determine that the objects in an image are the same object. For, example, an image detection system may look for differences that indicate the images do not capture a same object to prevent errors or fraud. In some embodiments, a property manager or landlord may place a visual sticker or other indicator with a code (e.g., QR code, bar code, or other code) on an object so that a visual detection system may identify the code to ensure that the same object is captured.

In an operation 2808, the first and second images are aligned such that features of the object in the first and second images align. Such alignment may include resizing, cropping, or otherwise adjusting the first and/or second images so that the features of the object properly align. For example, one or more edges, corners, or parts of an object in the first and second images may be aligned so that the images may be compared more accurately. In various embodiments, a machine learning model trained as described herein may compare images and the objects therein without any alignment, resizing, cropping, etc. As described herein, in some embodiments representations may be overlaid onto a display of a computing device to assist a user in taking photos that are well aligned with respect to the object being photographed. Thus, if photos are well aligned, a system may also not need to align the features of the objects.

In various embodiments, the alignment of the two images may be used to determine that the object in the two images is the same object. For example, if the edges or corners in an image can be aligned, the likelihood that the images capture the same object is high, while if the corners or edges in images cannot be aligned it is likely that the images do not capture the same object (or at least are of insufficient quality to properly compare the objects in the images). Other aspects may also be incorporated into various embodiments to perform validation that the same objects are being captured in images for subsequent inspections. For example, panoramic images or 3-D images of a room or property may be taken, so that every object in a room may be verified or catalogued, either automatically or manually. Analyzing such images may make it clearer that something major may have changed between image captures (e.g., was something moved, removed, replaced, etc. and not properly documented since the last inspection?). Using overlays of prior captured images as described herein to guide the capture of new images may also help ensure that images properly capture the correct objects.

In an operation 2810, at least one difference associated with the object based on a comparison between the first image and the second image is determined. Such differences may represent damage to the object, wear and tear, other objects obstructing the primary object that was not in one of the images, etc. Other differences may occur due to light at different times of day (e.g., shadows) or cause different colorations of images. However, of interest here is not changes of light or differences in obstructing objects, but any differences that may relate to the condition of the object.

Thus, in an operation 2812, at least one difference indicating damage to the object that exceeds wear and tear depreciation damage is determined. In various embodiments, wear and tear type damage may alternatively or additionally be detected. Damage detected that exceeds wear and tear may include scratches, marks, holes, missing parts (e.g., knobs), bent parts, etc. As described herein, a trained machine learning model may be used to determine damage, and determine whether that damage exceeds wear and tear damage, is wear and tear damage, and/or assess the extent of that damage (as further discussed below at least with respect to FIGS. 28, 29, 38, and 39).

Although the method 2800 describes comparing two images, additional images may be considered and/or compared by the system. For example, additional images taken at different times from the first and second images may be compared to determine damage and/or wear and tear to an object over time. In other examples, the system may be configured to receive multiple contemporaneously taken images of an object to compare to one or more images of the object taken at a different time. For example, multiple images of an object may be taken from different angles, and those images may be used to compare to one or more images of the objects captured at a different time. A machine learning model may be trained to consider multiple images of an object together to identify and assess damage as described herein. In some embodiments, the multiple images of different views of an object may capture some surfaces of an object in common. For example, a picture of a stove and a close-up picture of the stovetop may both show a stovetop. Thus, both images may be used to identify and assess damage to the stovetop. In some embodiments the system may also automatically identify the surfaces of an object that appear in multiple images. Such identification may be useful when damage is identified so that the system may verify that the damage is present in the other image showing the surface.

In various embodiments, the automated system for identifying and assessing damage in an image may consider an amount of elapsed time between when a first image was captured of an object and when a second image of the object was captured. For example, a trained machine learning model may be able to identify based on how much time has elapsed between photographs whether damage to an object is wear and tear depreciation or material damage for which a tenant should be liable. For example, damage to carpet identified between images that were taken ten years apart may be due to wear and tear, while the same damage identified in carpet in images that were taken a year apart may be due to damage caused by a tenant for which the tenant is liable. As discussed further herein, by inputting tagged image pairs and the amounts of time between when they were captured into a machine learning algorithm, a model may be trained to recognize when damage is wear and tear versus material damage based on the elapsed time between new images. The training and use of such a model is discussed further herein with respect to FIGS. 29-39.

Figure 29:
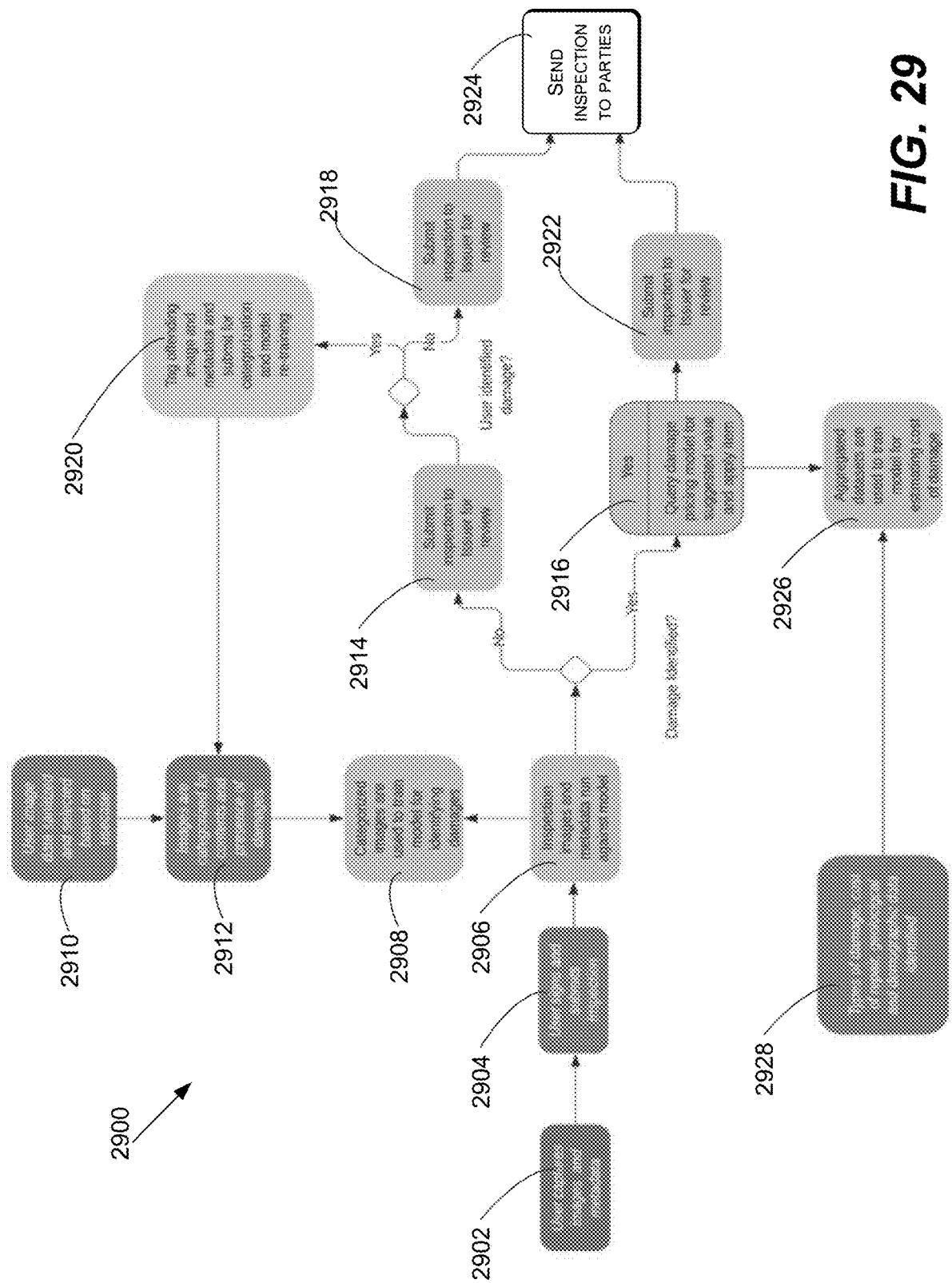
FIG. 29 is a flow chart illustrating an example method of identifying and assessing damages and training a model for identifying and assessing damages to an object, in embodiments.

FIG. 29 is a flow chart illustrating an example method 2900 of identifying and assessing damages and training a model for identifying and assessing damages to an object, in embodiments. As described herein, determining that at least one difference between two or more images is associated with damage to the object (e.g., wear and tear depreciation damage or damage that exceeds wear and tear) may include processing the images with a trained machine learning model. In addition to using training a model to identify and assess damages and using a trained model to identify and assess damages as shown in the method 2900, images captured during inspections may be added to data sets that are used to further refine and train models for identifying and assessing damage in images captured of objects over time.

At an operation 2902 of the method 2900, images are captured by users as described herein, and metadata of those images is also created and collected. Metadata may include timestamps (e.g., date, time of image capture), type of device or camera, an identifier of a device or camera, geographic location of device when image is captured, other data appended to image relating to the step or instructions for an inspection that are relevant to an image being captured, etc. For example, when an image is captured and the instructions during the inspection are to take a picture of a front door, that image may be tagged "front door" (or something similar depending on the instruction). The image may also include metadata related to other information input by the user as described herein, such as a condition of the object, damage identified in the image (e.g., as described herein with respect to FIGS. 32-37), or any other notes or inputs related to an image. The operation 2902 may be carried out according to any of the embodiments described herein for performing an inspection, such as those discussed herein with respect to FIGS. 1-27.

At an operation 2904, a user signs and submits the inspection they have performed, which includes the captured images and generated metadata in the operation 2902. The user may sign and submit an inspection using a user interface on an electronic device such as the user interface 2700 of FIG. 27. Those images and metadata may be processed by a trained machine learning model to identify damage in the images at an operation 2906. In some embodiments, a machine learning model may not be used because users may tag images as showing damage so that automatic identification of damage may not be necessary. Any images that are categorized as containing damage (either by a user manually or as determined by a machine learning model) may be used to train or further refine a model for identifying damage at an operation 2908.

In addition to images relating to a specific inspection, aggregated images and metadata from other inspections may be sanitized and selected at an operation 2910 for use in training a damage identification model. At an operation 2912, those images may be categorized for contents (e.g., what type of object is in the photographs) and presence of damages (e.g., is there damage shown in the photographs). In other words, images of objects may be manually categorized for their contents and whether damage is shown and used to train the model for identifying damage. In various embodiments, the images used to train such a model may be pairs of images with elapsed time between them (e.g., two images showing a same object with and without damage, respectively), or may be images unrelated to other images used to train the model. In other words, in an example, a model may be trained by inputting into an untrained machine learning model a plurality of pairs of images associated with a plurality of objects, wherein each pair of the plurality of pairs of images comprises an earlier captured image of an example object of the plurality of objects and a later captured image of the example object. In such examples, a machine learning algorithm may be used that can incorporate the relationship between two photographs of the same object taken at different times into its learning. Models for assessing an amount of damages (e.g., a damage pricing model as discussed below with respect to operations 2916, 2926, and 2928 below) may be trained in similar or different ways.

If the analysis of the images at the operation 2906 does not identify damage, the images may be sent for a manual inspection for review at an operation 2914. The manual review may determine whether the model properly categorized the images as having or not having damage therein. The model and the manual review may be configured to identify only damage that exceeds wear and tear damage, or may be configured to identify any type of damage (e.g., material damage and wear and tear damage). In other words, the model and manual review may only be looking for damage that exceeds a particular threshold indicating material damage. In other embodiments, where the manual review and model are configured to recognize any damage, a model for assessing value of the damage may be used to categorize whether the damage is wear and tear or material damage based on, for example, an amount of damage. In yet another example, a third model (beyond the damage identification and damage assessment models) may be specifically trained to identify whether damage is wear and tear or material damage.

If a manual review at the operation 2914 identifies damage in the images, the images may be tagged as incorrect (or may be re-tagged such that the metadata associated with the image indicates that the image includes damage), so that they can be resubmitted to refine or re-train the model that missed the damage in the images initially at an operation 2920. If the manual review at the operation 2914 does not identify any damage, the images may be sent for a second manual review at an operation 2918 to ensure that no damage is in the images. The inspection records may then be sent to the parties (e.g., renter, landlord, property manager, etc.) at an operation 2924. Although not shown, if a manual review identifies damage at the review of the operation 2914, the inspection may still be sent to the parties afterward as in the operation 2924. In addition, if a manual review identifies damage, the images may be processed to the operation 2916 discussed below for assessing a damage value associated with the images. Two manual inspections may be performed at the operations 2914 and 2918 to ensure that no inspections are sent out to the parties erroneously indicating that no damage occurred to a property or its various objects. In various embodiments, more or less manual review of the inspection may occur than the two instances shown in the operations 2914 and 2918.

If damage is identified in images at the operation 2906, the images may be further analyzed at an operation 2916 using a damage pricing model to determine a suggested value of the item or the damage to the item (e.g., a replacement or repair cost). At an operation 2926, datasets may be used to train a damage pricing model for estimating the cost of damage identified in images. For example, information may be identified at an operation 2928 to be used for training a damage pricing model. Such information may include, for example, images categorized/tagged by types of damage, types of objects, cost of repair or replacement, geological data, geographic data, demographic data, or any other type of data that may factor into the value of damage to various objects associated with a property. Although not shown in FIG. 29, a manual review of damage assessment of images that have damage may also be used to further refine or train a model for estimating cost of damages at the operation 2926 (similar to how such recategorized images at the operation 2920 or initially categorized images at the operation 2906 as having damage may be used to refine or train a model for identifying whether damage is present at the operation 2908).

Once the query damage pricing model suggests a value for the damage identified at the operation 2916, the value of the damage and/or the identification of the damage at the operation 2906 may be reviewed in a manual review at an operation 2922. Such a manual review may ensure that any damage was properly classified as damage, that any images without damage were properly classified as not having damage, and that any estimated value of damage is accurate and or reasonable (e.g., within an expected range given the type of object and the extent of the damage). After a manual review at the operation 2922, the inspection may be sent to the parties at the operation 2924. Although a single manual review is shown for images that are initially categorized as having damage at the operation 2906, more or less manual reviews may be performed on the images.

As described herein, pairs of images may also be input into machine learning models to train or refine models, whether the models are for identifying damage, determining whether damage is wear and tear or material, or for estimating a cost of damage to an object in the images. In such embodiments, times at which each of the images in a pair of images were taken or an elapsed time indicating the time passed between the earlier captured image and the later captured image of the image pairs may also be input. This, together with other inputs such as damage value, type of damage, object type, etc., may train the model to more accurately identify and assess damage in images based on an amount of time that has passed between the capture of images. For example, images showing a scuffed hardwood floor or bent window blinds may indicate material damage if such scuffs or bends are identified in an image taken one year after an image showing a newly stained hardwood floor or an image taken one year after new blinds were installed, respectively. However, images showing a scuffed hardwood floor compared to an image from a year before that show scuffs, or images showing a scuffed hardwood floor compared to an image from fifteen years before that does not show scuffs, may not indicate material damage. Similarly, while year old blinds that are bent may indicate material damage, ten-year-old blinds that have bends in them may not indicate damage. Accordingly, identifying objects in images and tracking them over time may be helpful in assessing the extent of and value of damage. Thus, inputting images with data indicating their relationship to one another (whether two images show the same object and the time passed between the capture of the images) may be helpful in adequately identifying and assessing damages. Thus, when inspections are performed as described herein, it may be valuable to determine, either through manual tagging, automatic tagging based on image recognition, or any other method, when images taken at different times are of the same object. In this way, a trained model may be able to better track the extent and value of damage sustained to various objects. Thus, the methods and systems herein may accommodate inputs from a user to indicate when objects are replaced so that the system may begin the timeline for tracking damage to an object again.

Some models may also be trained using data that indicates the extent of and/or presence of damage shown in images or pairs of images. For example, for the model for identifying damage as applied at the operation 2906 of FIG. 29, images and a tag indicating whether or not damage is present in the image, alone or in combination with other information, may be used to train such a model. In another example, information indicating whether damage is wear and tear or material damage may be indicated and input to train a model to identify when damage rises to a material damage threshold.

As described herein, a machine learning model may also be trained to determine an estimated value associated with the damage to the object. That value may be associated with wear and tear (e.g., a depreciation of the object) or may be associated with material damage for which a tenant should be liable. The material damage value may represent a cost to repair or replace the object. In various embodiments, a landlord or property manager may input the value of various objects when they are installed in a property. In this way, the systems and methods herein may be used to track the value of those objects as they are inspected over time. For example, a washing machine may be purchased for $500, and the systems and methods herein may indicate during an annual inspection that such a washing machine depreciates approximately $50 a year. In other examples, various objects may depreciate at varying rates over time. Thus, a value remaining of an object may be used to determine a replacement cost of the washing machine if a tenant damages it beyond repair, or the new cost of the object may be used as the replacement cost. For example, if the washing machine described above is damaged beyond repair after three years of use, the system may recommend a replacement cost for which a tenant is liable of $350.

The various machine learning models described herein may be trained and/or refined using different architectures, input data, etc. As just two non-limiting examples, architectures described with respect to FIGS. 38 and 39 may be used to train and implement models for identifying damage and estimating cost of identified damage, respectively.

FIGS. 30 and 31 are example user interfaces 3000 and 3100, respectively, for overlaying a representation of an object onto a user interface of a mobile computing device, in embodiments. For example, such overlays may be used as described in the operation 304 of FIG. 3. The user interface 3000 shows a first image 3002 that represents a field of view of a camera of an electronic device such as a smartphone. Overlaid on the first image 3002 is a representation 3004 of a refrigerator, and in particular an image of a refrigerator. The overlaid representation 3004 may be used to align the field of view with an actual refrigerator that may appear in the first image 3002 if the actual refrigerator is within the field of view of the camera (though not shown in FIG. 30). In some embodiments, the overlaid representation may be a prior image captured of the actual refrigerator associated with a property. For example, if a property was inspected a year prior to a current inspection, prior photos of objects taken during the prior inspection may be modified to be partially transparent and used as overlays for images captured for the current inspection. As described herein, the overlaid representations may also cause users to capture more consistent and/or better-quality images that may more easily be used to identify and/or assess damage in the captured images.

In the user interface 3100, a first image 3102 representing a field of view of a camera is shown similar to FIG. 30. In addition, a representation 3104 showing an outline of a refrigerator is overlaid onto the first image 3102. The representation 3104 may also be partially transparent such that the portions of the image 3102 that are behind the representation 3104 may still be partially visible in the user interface 3100. As shown in each of the user interfaces 3000 and 3100, not only may a representation be overlaid over an image representing a field of view of a camera of an electronic device, but instructions for capturing an image may also be overlaid over the image and/or the representations.

FIGS. 32-37 are example user interfaces for detecting or selecting areas within an image that show damage to an object, in embodiments. FIG. 32 shows a user interface 3200 that shows an image 3202 of a wall in a field of view of a camera of a mobile electronic device as described herein. The image shows a hole 3204 in the wall, and a bounding box 3206 around the hole 3204. The bounding box 3206 may be added automatically by the application upon detection of the hole 3204 based on image recognition software and/or use of the trained models described herein. In other words, the system may be configured to identify damage in real time while a user is inspecting a property. In other embodiments, the bounding box 3206 may be inserted over the image 3202 based on a user input, such as touching a touch screen of a smartphone in the area where the hole 3204 is shown. In this way, a user may indicate an area of a photo where damage is shown.

If a user indicates damage by placing the bounding box 3206 or the application automatically identifies the hole 3204, an image captured that includes the hole 3204 may be stored along with metadata indicating that damage has been identified in the photo. In this way, the image may be categorized for a damage amount assessment and/or a determination of whether the damage exceeds wear and tear damage. In other embodiments, the automatic detection of the hole 3204 may be configured to only detect damage that is considered material damage. In other embodiments, if a user makes an input to highlight the damage, it may be assumed that such damage is material. A captured image including the hole 3204 may be stored with or without the bounding box 3206, or two images may be stored—one with and one without the bounding box 3206.

In various embodiments, the system may automatically detect potential damage in an image. If such potential damage is detected, the user may be prompted to enter more information, such as a note about the damage. The user may also be prompted to take a close-up photo of the damage, or otherwise input other information about the damage.

The user interface 3300 of FIG. 33 shows the same image 3202, but with a different bounding box 3302 that may be added based on an input from a user or may be automatically added based on the application identifying the damage in the image. The bounding box 3302 includes within it the hole 3204 and smaller holes 3304 and 3306. Accordingly, a larger bounding box may be used to capture multiple instances of damage at once.

In various embodiments, the bounding boxes 3206 and 3302 of FIGS. 32 and 33 may demonstrate different thresholds for identifying damage and/or determining that damage exceeds a wear and tear threshold. For example, the image 3202 shows a portion of a wall. Small holes, such as nail holes for hanging pictures, may not be considered material damage for which a tenant should pay in certain embodiments. In such an example, only the larger hole 3204 may be considered material damage and thus the bounding box 3206 highlighting the damage only surrounds the hole 3204. In contrast, if a threshold for exceeding wear and tear damage is set lower to include smaller holes such as the holes 3304 and 3306, a larger bounding box may be applied as shown in FIG. 33, because all of the holes should be considered damage for calculating value of damage to be withheld from a security deposit (or because the inspection being performed is a move-in inspection, and the tenant does not want damage associated with holes 3204, 3304 or 3306 to be withheld from his or her security deposit if those holes in the wall existed prior to the tenant moving in).

Figure 34:
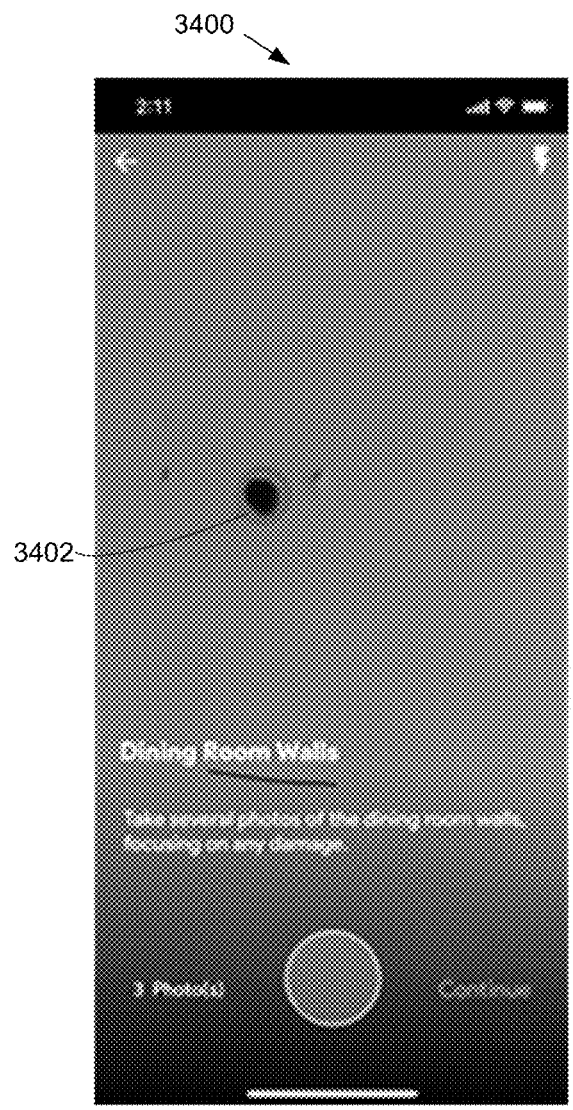

FIG. 34 shows a user interface 3400 that shows a circular shaped bounding 3402. The bounding 3402 may be automatically determined or may be inserted based on a user input. Other shapes of bounding marks may also be used other than a rectangular or circular shaped as shown. For example, users may even freeform draw a region of damage indicator onto a captured image. Bounding marks that more closely track the edges of damage may be used to better assess damage (e.g., how much will it cost to repair, does the damage exceed wear and tear, etc.).

Figure 35:
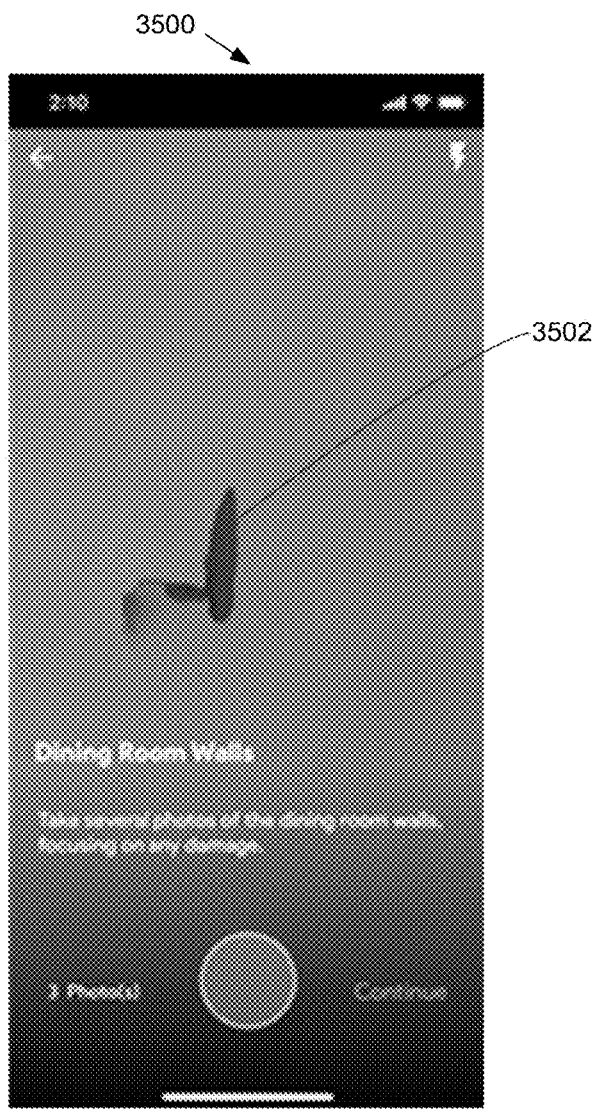
Figures 36, 37:
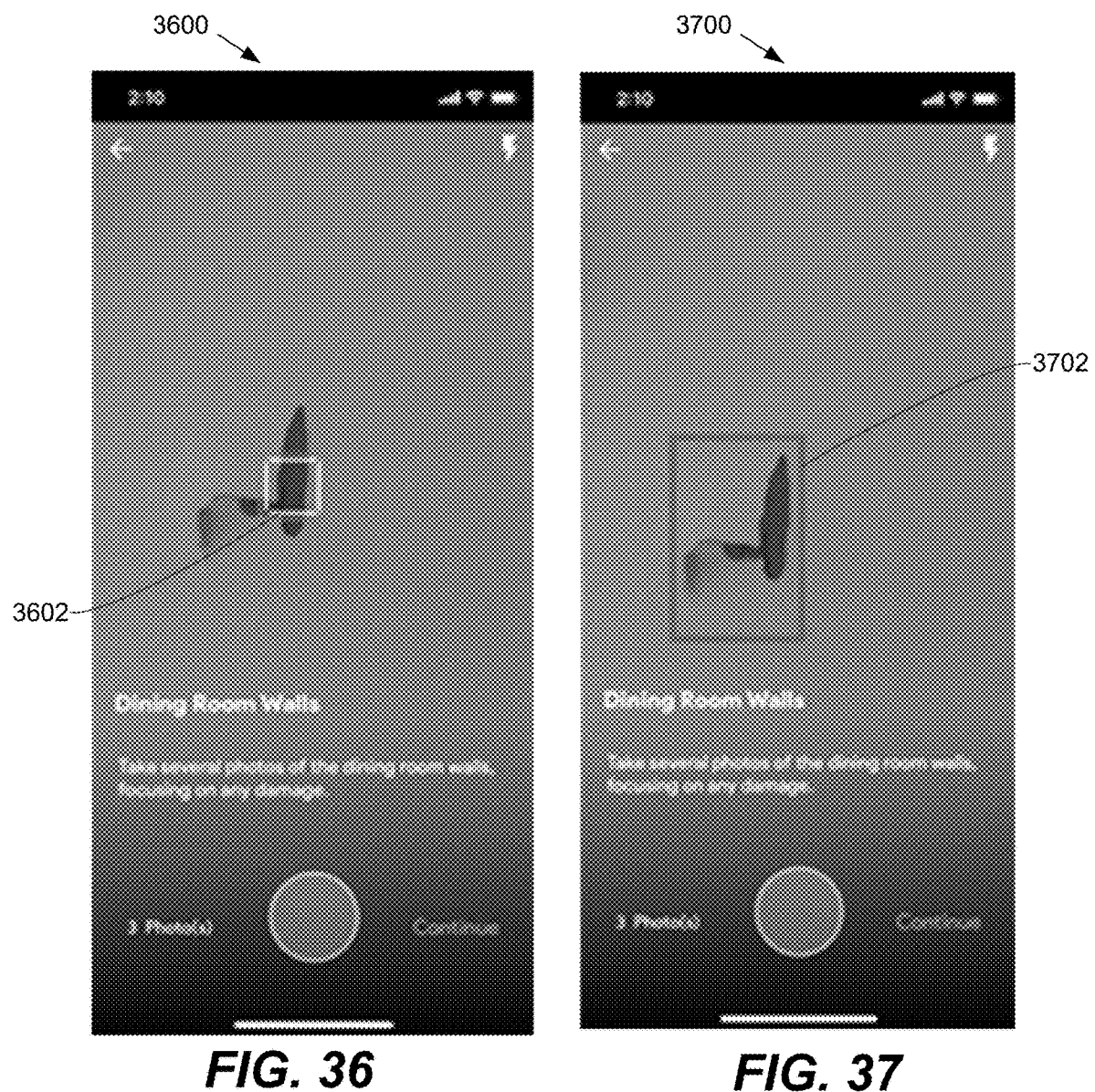

FIG. 35 shows a user interface 3500 that shows a larger, irregularly shaped hole 3502. FIG. 36 shows a user interface 3600 that has a bounding box 3602 similar to the bounding box 3206 of FIG. 32. The bounding box 3602 is too small to capture the edges of the hole, so larger bounding boxes, such as a bounding box 3702 of FIG. 37 may be used to highlight the damage in FIG. 37. In other words, variable-sized bounding boxes may be used so that damage is properly identified and assessed. In some embodiments, a standard size bounding box may be used to determine that damage exceeds a particular threshold (e.g., exceeds wear and tear damage). For example, since the hole in FIG. 36 is larger than the bounding box 3602, the damage may be considered material. By using instructions or overlaid representations, the pictures may be properly scaled so that such a bounding box may be indicative of an extent of damage.

The bounding boxes may also be used as inputs for training a machine learning model as described herein. For example, bounding boxes may be manually input to identify damage, and therefore may be used to train a model to recognize damage in other images.

Figure 38:
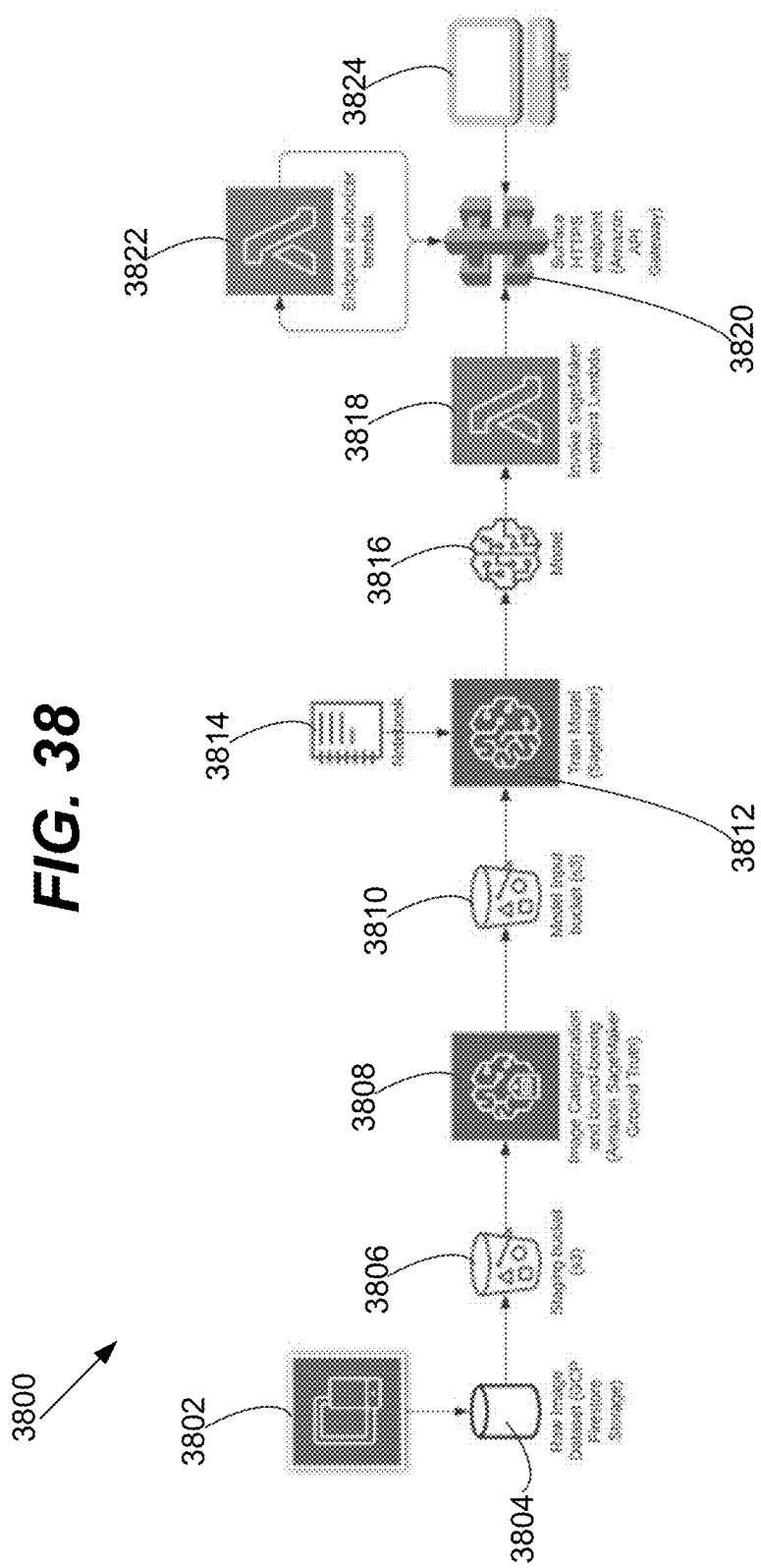
FIG. 38 is a schematic diagram showing an example architecture for training and using a damage recognition model, in embodiments.

FIG. 38 is a schematic diagram showing an example architecture 3800 for training and using a damage recognition model, in embodiments. The damage recognition model trained and implemented using the architecture of FIG. 38 may be used, for example, as the model for identifying damages as discussed with respect to the operations 2906, 2908, 2910, 2912, and 2920 of FIG. 29.

The architecture 3800 includes electronic devices 3802 from which inspection related data is received. For example, images, metadata relating to the images, information related to presence of damage in the images, etc. may all be received from the electronic devices 3802 and stored in a raw image dataset 3804. The raw image dataset 3804 may be stored in a server such as a cloud storage server. As just one example, the cloud storage may be a Google Cloud Platform (GCP) Firestore storage.

The raw image dataset 3804 may then be moved to a staging bucket 3806 so that the images may be easily staged and accessed for analysis and training a machine learning model as described herein. The staging bucket 3806 may be, for example, an Amazon Simple Storage Service (S3) staging directory. At operation 3808, if the images in the raw image dataset 3804 do not already have indicators of whether damage is present and associated bounding boxes, the images are pre-processed to categorize the images (e.g., as having damage or not having damage) and bound-box the areas in the images that reflect damage. Even for images that are labeled, pre-processing may still occur at the operation 3808 to standardize or properly categorize and bound box the images so that they are in an appropriate format for input into a machine learning algorithm. The operation 3808 may be performed by a data labeling service or may be implemented manually. A data labeling service such as Amazon SageMaker Ground Truth may be used to properly build and pre-process the raw image dataset 3804 for machine learning.

The pre-processed (e.g., categorized and bound-boxed) images and associated data may then be placed in a storage as a model input bucket (which may also use Amazon S3 storage) so that the pre-processed data may be easily input into a machine learning algorithm to train a damage recognition model at an operation 3812. The model may be trained using Amazon Sagemaker, for example. Various types of algorithms may be used to train a model for identifying and assessing damage as described herein. For example, convolutional or other types of artificial neural networks may be used to build/train models as described herein. A notebook 3814 as shown in FIG. 38 may be a repository for documentation and configuration pertaining to the training and deployment of machine learning models.

The model training at the operation 3812 yields a trained model 3816, which may be accessed or invoked using SageMaker endpoint Lambda 3818. In other words, once a model is trained and ready for use, an endpoint is established so that a server or other device implementing the methods and systems herein may apply the model or submit images for processing using the model to determine whether those images include damage to an object in those images. The model endpoint 3818 is accessed by such devices 3824 via a surface HTTPS endpoint 3820, such as an Amazon API Gateway. In other words, calls into and out of the model may be made using API calls. In addition, an endpoint authorizer 3822 may also be used to provide security for accessing and using the endpoint of the model (e.g., authorizing API calls in to the model).

Figure 39:
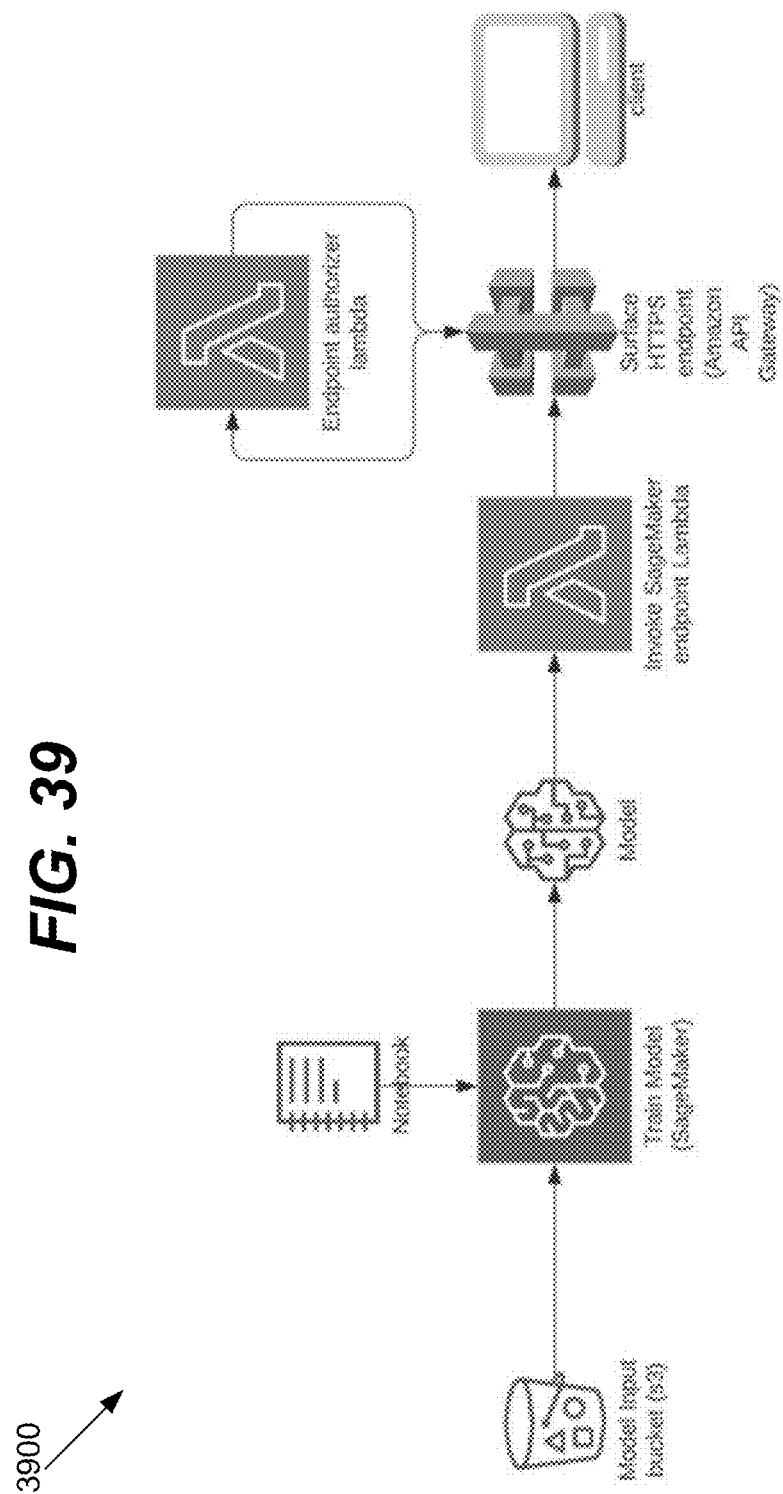
FIG. 39 is a schematic diagram showing an example architecture for training and using a damage assessment model, in embodiments.

FIG. 39 is a schematic diagram showing an example architecture 3900 for training and using a damage assessment model 3904, in embodiments. The damage assessment model trained and implemented using the architecture of FIG. 39 may be used, for example, as the model for estimating cost of damage as discussed with respect to the operations 2916, 2926, and 2928 of FIG. 29. The architecture 3900 has similar elements to the architecture 3800 of FIG. 38, but may have fewer elements because the damage assessment model may use datasets that do not require pre-processing such as image classification or other types of pre-processing. In various embodiments though, datasets that do require pre-processing may be used and, in those instances, an architecture more similar to that of FIG. 38 may be used to build/train models.

Other features related to the inspection systems and methods described herein may also be implemented in various embodiments. For example, the systems and methods herein may be used to determine a score for any of landlords, property managers, and/or renters. For example, parties may rate other parties they interact with based on their experiences. For example, a renter may rate their landlord and vice versa. In addition, the parties' scores may be adjusted based on data collected and/or entered related to inspections. For example, if after an inspection, an object is determined to be damaged beyond wear and tear, a renter's score may be adjusted downward based on damage to the object during the time in which the renter occupied the property. In some embodiments, an extent of damage to a property may be used to adjust a renter score up or down, such that a renter score may improve or decrease over time depending on how well the renter took care of properties they rented. Thus, a renter score may indicate how likely it is that the renter will cause more than wear and tear damage to a property. Other aspects of a renter may also be tracked for adjusting their renter score, such as how they pay their rent, how quickly does a property turn over when they have rented in the past, do they pay their rent on time, what level of damage and/or wear and tear does the tenant typically leave a property in, etc. Renters can likewise score landlords based on, for example, the amount and extent of any damage identified in a move-in inspection, and whether the landlord has responded to issues raised by the renter (e.g., broken refrigerator) in a timely fashion.

In this way, landlords may be able to see how likely a renter is to cause damage to a property based on their renter score, and renters may be able to see how attentive a landlord is to fixing damage before or after the renter moves in. Landlords and/or property managers may also have a score based in information collected using the systems and methods described herein. For example, if a landlord makes improvements to a property or objects thereon, replaces objects, makes repairs, etc., that information may be input via a user interface of an electronic device so that the system can keep track of the objects at a property, their condition, etc. For example, if a landlord paints walls before a new tenant moves in, the landlord may perform an inspection to document the newly painted walls. In another example, if a tenant submits a maintenance request because their furnace is broken, the landlord may input that the furnace was repaired or replaced so that the value and/or depreciation of the furnace may be accurately calculated according to the various systems and methods described herein. Thus, the inputs of a landlord or property manager may be compared to maintenance request from a tenant to determine how responsive the landlord or property manager is. Such information may be used to adjust a landlord score up or down. How much and how often landlords return deposits may also be tracked and used to adjust a landlord score. Accordingly, the landlord and renter scores may be used by all types of parties to find future renters or landlords that will lead to better and more productive landlord/tenant relationships. A renter score may be used by a landlord, for example, to set a security deposit amount that properly guards the landlord against potential loss.

A renter score may further be adjusted based on how often a renter reports damage or maintenance issues during a lease term or the general cleanliness of a property during an inspection during or at the conclusion of a lease. A landlord may further be prompted to rate a renter based on aspects such as tenant behavior, how helpful a tenant is in scheduling maintenance and/or damage repairs, whether the landlord would be likely to rent to the tenant again, etc.

A renter score or a landlord score may be adjusted based on compliance with inspection schedules or completion levels of assigned inspections. For example, if a landlord, renter, or other party does not finish an inspection 100% or do not capture usable images of objects on the property it may impact their score negatively, while completing an inspection properly may improve a renter score. A landlord score may further be adjusted negatively if they do not timely return an agreed upon portion of a security deposit.

As tenants rent other properties and/or landlords rent to various tenants over time, a score may evolve so that the score may more accurately represent a renting power of a tenant or landlord (e.g., how good of a tenant or landlord are they?). Such ratings may help increase demand for the renter or landlord so that they can request or demand more favorable terms on leases.

Landlord scores may also be calculated using tenant inputs about landlords, such as how good landlords are at maintenance repair and response, scheduling maintenance and damage repairs, overall condition of property, likeliness to rent from again, security deposit deductions, and/or time to return security deposit. Landlord ratings may also be adjusted based on condition of property and objects on the property as determined by automatic image analysis as described herein. Landlord ratings may also be adjusted based on landlord user behavior and compliance with inspections and the steps of inspections: how good is the landlord at taking photos and completing all steps of an inspection, do they respond timely to maintenance requests, how do actual security deposit deductions compare to recommended deductions as determined by the methods and systems described herein, etc.

The data collected as part of performing inspections, landlord ratings, and/or renter ratings may also be used by insurance companies. For example, renters insurance rates may be adjusted based on how well renters or landlords perform inspections, as insurance companies want to know security and fire prevention aspects of a property are in place and working. In another example, historical inspection data or images may be useful in assessing renters insurance claims.

Data collected using the inspections described herein may also be used to determine damages or wear and tear depreciation over time. For example, if a landlord inputs when a new appliance is installed and the appliance type, the inspection data for all appliances of that type (e.g., brand, model, etc.) may be aggregated to predict a lifetime of the appliance, what the depreciation per year is, etc. Such information may be valuable for landlords in selecting appliances to buy (e.g., to help them determine which ones offer the best value over time), and predict when expenditures for improvements or replacement of certain objects must occur. In other words, aggregating such data may help a landlord better prepare for future work and expenditures. Aggregated data on aspects of a property other than appliances may also be used. For example, such data may indicate how often carpet of different types must typically be replaced, how often walls must be painted, how often windows must be replaced, how often floors or decks have to be refinished, etc. Aggregated data may also be used to optimize the design of future inspections. For example, inspections may be designed to focus more on items that are determined to be more likely to be damaged by a renter. In another example, more frequent and brief inspections may focus only on problem areas identified from aggregated data, while less frequent and exhaustive inspections may inspect and document all aspects of a property. Thus, the most problematic areas of a property that are likely to be damaged may be inspected more often.

In various embodiments, the systems and methods herein may also be used to facilitate rent payments and/or security deposit payments, refunds, and/or holding the security deposits in escrow, including while the amount of security deposit to be returned is negotiated based on inspections completed as described herein. In an embodiment, a different structure for handling rent and/or security deposit payments may be facilitated. For example, a renter may pay the first and twelfth month's rent upon a one-year lease beginning (payments 1 and 2). The next 10 months a single month payment may be made (payments 3-12 for the lease, such that entire lease amount is paid by the $11^{th}$ month). At the beginning of the twelfth month, the renter may pay a user or wear and tear fee (payment 13) to the landlord, where material damage beyond the amount of such fee must be paid or reimbursed by the renter. The twelfth month rent (payment 2) may be held in escrow and a contract may indicate that some or all of that rent payment may be abated or forgiven if there is no damage to the property during the lease. If there is damage, the amount is split between the renter and landlord based on the damage. The abatement or amount given back to the renter may be calculated based on the inspections performed, the determination of any damage, and/or the estimated value of that damage as calculated according to the systems and methods described herein. In some embodiments, the renter and landlord may agree to abide by whatever amount the systems and methods described herein calculate as compensation to the landlord for damage to the property.

In some embodiments, the damage level may be calculated not based on specific itemized damages, but on an overall damage rating level. For example, a 1-5 scale may be used where a level 1 damage (low level of damage) assessment results in all of the rent payment held in escrow is refunded versus level 5 where none of the rent payment is refunded but instead transferred to the landlord to cover damages to the property. In between, level 2 may return 75% of the rent payment to the renter, level 3 may return 50%, and level 4 may return 25%. In various embodiments, other rating systems and reimbursement amounts or schemes may be used. In some embodiments, the payments may be returned to the landlord and/or renter in various ways, such as by wire, check, pre-paid gift/debit cards, etc.

Although the systems and methods described herein are related to landlords and renters, either party may use the systems and methods herein for performing inspections even if the other party does not. For example, a renter may perform inspections as described herein to document the state of their property on move-in or move-out, even if the landlord does not use the software, so that the renter has good information about the property to challenge any deductions to their security deposit at the end of the lease. Similarly, a landlord and their employees or associates may perform automated inspections even if they do not require their renters to do so. In addition, renters and landlords may choose to each perform an inspection around the same time (e.g., around move-in, move-out, etc.). Inspections performed within a predetermined threshold of time (e.g., within a day, within a week, within a month) of one another may be aligned inspections. Such aligned inspections may be used to compare to one another to make sure each party did a complete and accurate inspection, as any major differences noted may indicate an issue with one of the parties' inspection. In addition, the multiple inspections may be used for redundancy. For example, if a photograph of a particular object did not turn out well (e.g., out of focus, bad lighting) when taken by one party, the other party may have taken a better photo that can be used for comparisons with later or previously captured images of an object. If photographs are slightly different but both still useable, they may both be used to further refine or train machine learning models as described herein.

Although inspection of property is described herein, the inspection methods and systems described herein are not so limited. Any type of inspection may be performed using the systems and methods herein. In addition, the image comparison systems and methods for determining changes in images over time may also be used in different contexts than property inspections. In addition, while still images captured using a camera are discussed herein at length, other types of image capture may also be used, such as video, live-photos, 3-D imaging such as depth sensing (e.g., LiDAR), infrared, or any other type of image capture may be used and compared using the methods described herein to detect changes, which may or may not be indicative of damage. Similarly, the machine learning algorithms trained as described herein may also be trained using different types of media than just still images.

Figure 40:
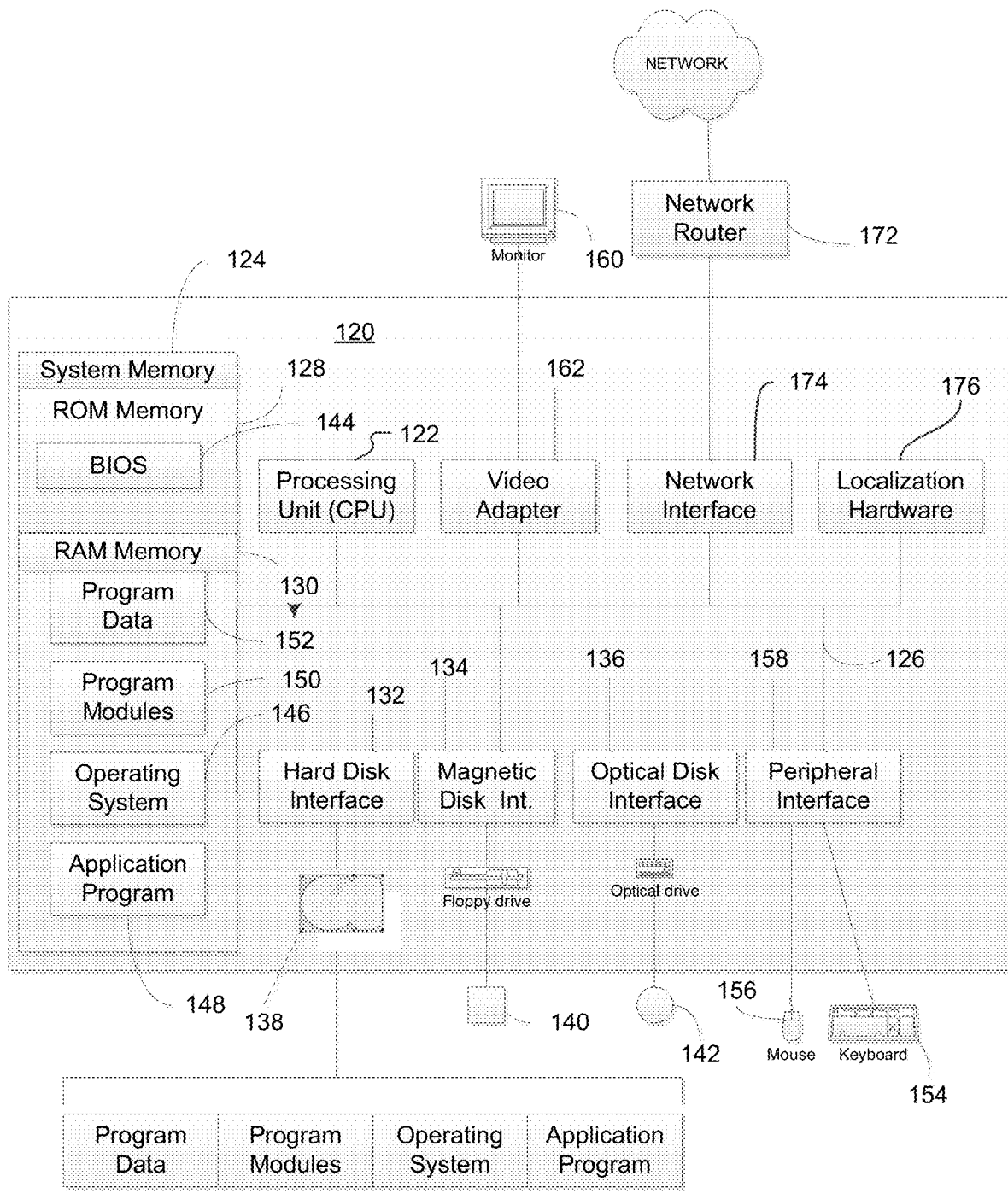
FIG. 40 is a diagrammatic view of an example user computing environment, in embodiments.

FIG. 40 is a diagrammatic view of an illustrative computing system that includes a general purpose computing system environment 120, such as a desktop computer, laptop, smartphone, tablet, or any other such device having the ability to execute instructions, such as those stored within a non-transient, computer-readable medium. Furthermore, while described and illustrated in the context of a single computing system 120, those skilled in the art will also appreciate that the various tasks described hereinafter may be practiced in a distributed environment having multiple computing systems 120 linked via a local or wide-area network in which the executable instructions may be associated with and/or executed by one or more of multiple computing systems 120.

In its most basic configuration, computing system environment 120 typically includes at least one processing unit 122 and at least one memory 124, which may be linked via a bus 126. Depending on the exact configuration and type of computing system environment, memory 124 may be volatile (such as RAM 130), non-volatile (such as ROM 128, flash memory, etc.) or some combination of the two. Computing system environment 120 may have additional features and/or functionality. For example, computing system environment 120 may also include additional storage (removable and/or non-removable) including, but not limited to, magnetic or optical disks, tape drives and/or flash drives. Such additional memory devices may be made accessible to the computing system environment 120 by means of, for example, a hard disk drive interface 132, a magnetic disk drive interface 134, and/or an optical disk drive interface 136. As will be understood, these devices, which would be linked to the system bus 126, respectively, allow for reading from and writing to a hard disk 138, reading from or writing to a removable magnetic disk 140, and/or for reading from or writing to a removable optical disk 142, such as a CD/DVD ROM or other optical media. The drive interfaces and their associated computer-readable media allow for the nonvolatile storage of computer readable instructions, data structures, program modules and other data for the computing system environment 120. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 120.

A number of program modules may be stored in one or more of the memory/media devices. For example, a basic input/output system (BIOS) 144, containing the basic routines that help to transfer information between elements within the computing system environment 120, such as during start-up, may be stored in ROM 128. Similarly, RAM 130, hard drive 138, and/or peripheral memory devices may be used to store computer executable instructions comprising an operating system 146, one or more applications programs 148 (such as a Web browser, retailer's mobile app, retailer's point-of-sale checkout and ordering program, and/or other applications that execute the methods and processes of this disclosure), other program modules 150, and/or program data 152. Still further, computer-executable instructions may be downloaded to the computing environment 120 as needed, for example, via a network connection.

An end-user, e.g., a customer, retail associate, and the like, may enter commands and information into the computing system environment 120 through input devices such as a keyboard 154 and/or a pointing device 156. While not illustrated, other input devices may include a microphone, a joystick, a game pad, a scanner, etc. These and other input devices would typically be connected to the processing unit 122 by means of a peripheral interface 158 which, in turn, would be coupled to bus 126. Input devices may be directly or indirectly connected to processor 122 via interfaces such as, for example, a parallel port, game port, firewire, or a universal serial bus (USB). To view information from the computing system environment 120, a monitor 160 or other type of display device may also be connected to bus 26 via an interface, such as via video adapter 162. In addition to the monitor 160, the computing system environment 120 may also include other peripheral output devices, not shown, such as speakers and printers.

The computing system environment 120 may also utilize logical connections to one or more computing system environments. Communications between the computing system environment 120 and the remote computing system environment may be exchanged via a further processing device, such a network router 172, that is responsible for network routing. Communications with the network router 172 may be performed via a network interface component 174. Thus, within such a networked environment, e.g., the Internet, World Wide Web, LAN, or other like type of wired or wireless network, it will be appreciated that program modules depicted relative to the computing system environment 120, or portions thereof, may be stored in the memory storage device(s) of the computing system environment 120.

The computing system environment 120 may also include localization hardware 176 for determining a location of the computing system environment 120. In embodiments, the localization hardware 176 may include, for example only, a GPS antenna, an RFID chip or reader, a WiFi antenna, or other computing hardware that may be used to capture or transmit signals that may be used to determine the location of the computing system environment 120.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method for determining damage caused to an object associated with a property, the method comprising:
   receiving, by a processor of a computing device, a first image of an object, the first image being captured at a first time;
   receiving, by the processor, a second image of the object, the second image being captured at a second time different from the first time;
   determining, by the processor, that the object in the first image is a same object in the second image;
   aligning, by the processor, features of the object in the first image to the features of the object in second image, the aligning comprising:
      determining at least one of an edge, corner, or part of the object in each of the first and second images, and
      resizing or cropping at least one of the first or second images so that the edge, corner, or part of the object in the first and second images aligns upon overlaying the first and second images;
   determining, by the processor, at least one difference associated with the object based on a comparison between the first image and the second image; and
   determining, by the processor, that the at least one difference indicates damage to the object that exceeds wear and tear depreciation damage, wherein the determination that the damage exceeds wear and tear depreciation damage is based at least in part on an amount of elapsed time between the first time and the second time.

2. The method of claim 1, wherein the determining that the at least one difference is associated with damage to the object that exceeds wear and tear depreciation damage further comprises processing the first and second images with a trained machine learning model.

3. The method of claim 2, wherein the trained machine learning model is trained by inputting into an untrained machine learning model a plurality of pairs of images associated with a plurality of objects, wherein each pair of the plurality of pairs of images comprises an earlier captured image of an example object of the plurality of objects and a later captured image of the example object.

4. The method of claim 3, wherein the trained machine learning model is further trained by:
   inputting into the untrained machine learning model times at which each image of the plurality of pairs of images were taken or elapsed times indicating time passed between the earlier captured image and the later captured image of each of the plurality of pairs of images; and
   inputting into the untrained machine learning model data indicating extent of damage to the plurality of objects in the plurality of pairs of images.

5. A non-transitory computer readable medium having instructions stored thereon that, upon execution by a computing device, cause the computing device to perform operations comprising:
   receiving a first image of an object, the first image being captured at a first time;
   receiving a second image of the object, the second image being captured at a second time different from the first time;
   determining at least one difference associated with the object based on a comparison between the first image and the second image by aligning at least one feature of the object in the first image to at least one feature of the object in the second image, the aligning comprising:
      determining at least one of an edge, corner, or part of the object in each of the first and second images, and
      resizing or cropping at least one of the first or second images so that the edge, corner, or part of the object in the first and second images aligns upon overlaying the first and second images; and
   determining that the at least one difference indicates damage to the object that exceeds wear and tear depreciation damage.

6. The non-transitory computer readable medium of claim 5, wherein the instructions further cause the computing device to perform operations comprising determining that the object in the first image is a same object in the second image.

7. The non-transitory computer readable medium of claim 5, wherein the determining that the at least one difference is associated with damage to the object that exceeds wear and tear depreciation damage is based at least in part on an amount of elapsed time between the first time and the second time.

8. The non-transitory computer readable medium of claim 5, wherein the determining that the at least one difference is associated with damage to the object that exceeds wear and tear depreciation damage further comprises processing the first and second images with a trained machine learning model.

9. The non-transitory computer readable medium of claim 8, wherein the trained machine learning model is trained by inputting into an untrained machine learning model a plurality of pairs of images associated with a plurality of objects, wherein each pair of the plurality of pairs of images comprises an earlier captured image of an example object of the plurality of objects and a later captured image of the example object.

10. The non-transitory computer readable medium of claim 9, wherein the trained machine learning model is further trained by inputting into the untrained machine learning model times at which each image of the plurality of pairs of images were taken or elapsed times indicating time passed between the earlier captured image and the later captured image of each of the plurality of pairs of images.

11. The non-transitory computer readable medium of claim 9, wherein the trained machine learning model is further trained by inputting into the untrained machine learning model data indicating extent of damage to the plurality of objects in the plurality of pairs of images.

12. The non-transitory computer readable medium of claim 5, wherein the instructions further cause the computing device to perform operations comprising determining an estimated value associated with the damage to the object.

13. The non-transitory computer readable medium of claim 5, wherein the instructions further cause the computing device to perform operations comprising adjusting a renter score based on the damage to the object, wherein the renter score is associated with a tenant who rented a property associated with the object during at least some of an elapsed time between the first and second times.

14. The non-transitory computer readable medium of claim 13, wherein the renter score further estimates a likelihood of a tenant to cause damage to a property that exceeds wear and tear depreciation damages.

15. A method for capturing an image of an actual object associated with a property using a mobile computing device, the method comprising:
  displaying, by a processor of the mobile computing device, a first image representing a field of view of a camera of the mobile computing device on a display of the mobile computing device;
  overlaying, by the processor, a representation of an object associated with a property on the display that is also displaying the first image;
  displaying, by the processor, instructions for capturing a second image, wherein the instructions are displayed on the display along with the representation and the first image;
  receiving, by the processor, an input requesting capture of the field of view of the camera to capture the second image;
  transmitting, by the processor to a second computing device, the second image captured by the camera in response to the input, wherein:
    the second image comprises an actual object associated with the property,
    the second image is saved in a memory of the mobile computing device without the instructions or the representation of the object overlaid on the second image, and
    the instructions and the representation of the object are configured such that the second image capture is comparable to a third image captured of the actual object at a different time from when the second image was captured; and
  determining, by the second computing device, at least one difference associated with the actual object based on a comparison between the first image and the second image by aligning at least one feature of the actual object in the first image to at least one feature of the actual object in the second image, the aligning comprising:
    determining at least one of an edge, corner, or part of the actual object in each of the first and second images, and
    resizing or cropping at least one of the first or second images so that the edge, corner, or part of the actual object in the first and second images aligns upon overlaying the first and second images.

16. The method of claim 15, wherein the representation of the actual object associated with the property overlaid onto the first image is partially transparent, such that features of the first image are partially visible where the representation is displayed.

17. The method of claim 15, wherein third image was captured prior to the second image, and wherein the representation of the object associated with the property is based on the third image.

* * * * *